US012460725B1

(12) United States Patent
Koniski et al.

(10) Patent No.: US 12,460,725 B1
(45) Date of Patent: Nov. 4, 2025

(54) FLUID FITTING COUPLERS AND COUPLING SYSTEM

(71) Applicant: AeroFarms, Inc., Newark, NJ (US)

(72) Inventors: John Koniski, New York, NY (US); John James Tarter, Henderson, NV (US)

(73) Assignee: New AeroFarms, Inc., Ringgold, VA (US)

(*) Notice: Subject to any disclaimer, the term of this patent is extended or adjusted under 35 U.S.C. 154(b) by 219 days.

(21) Appl. No.: 18/118,392

(22) Filed: Mar. 7, 2023

Related U.S. Application Data

(60) Provisional application No. 63/318,797, filed on Mar. 11, 2022.

(51) Int. Cl.
| | |
|---|---|
| *F16L 5/02* | (2006.01) |
| *B65D 81/32* | (2006.01) |
| *F16J 15/3284* | (2016.01) |
| *F16L 41/18* | (2006.01) |

(52) U.S. Cl.
CPC ....... *F16J 15/3284* (2013.01); *B65D 81/3211* (2013.01); *F16L 5/025* (2013.01)

(58) Field of Classification Search
CPC ... F16L 5/025; F16L 5/06; F16L 41/12; F16L 41/14; F16L 41/18
See application file for complete search history.

(56) References Cited

U.S. PATENT DOCUMENTS

| | | | | |
|---|---|---|---|---|
| 4,224,464 A | * | 9/1980 | Bunnell | F16L 41/14 285/151.1 |
| 4,676,533 A | * | 6/1987 | Gerondale | F16L 41/14 285/332 |
| 4,828,296 A | * | 5/1989 | Medvick | F16L 41/14 285/316 |
| 4,983,784 A | * | 1/1991 | Whitlock | F16L 5/06 174/669 |
| 5,285,829 A | * | 2/1994 | Bravo | F16L 5/06 141/367 |
| 5,621,191 A | * | 4/1997 | Norris | F16L 41/14 174/653 |

(Continued)

FOREIGN PATENT DOCUMENTS

| | | |
|---|---|---|
| CN | 102771374 A | 11/2012 |
| DE | 202010005054 U1 * | 9/2011 ................ F16L 5/06 |

(Continued)

*Primary Examiner* — Zachary T Dragicevich
*Assistant Examiner* — Fannie Kee
(74) *Attorney, Agent, or Firm* — McCarter & English, LLP

(57) ABSTRACT

A fluid coupling system is provided that includes a first coupler that can be mounted to a first support, and a second coupler that can be mounted to second support. Each of the first and second couplers include a coupler body extending through openings of the respective support walls, and gaskets positioned over the coupler body and on opposing sides of the respective walls of the first and second supports. The gaskets form a fluid tight seal between the first and second coupler bodies and the respective supports, while permitting pivoting of the first and second couplers relative to the respective supports to accommodate for misalignment of the first and second couplers. In some embodiments the first and second supports can be walls of a container or can include framing that supports the containers.

32 Claims, 8 Drawing Sheets

(56) References Cited

U.S. PATENT DOCUMENTS

| | | | | |
|---|---|---|---|---|
| 5,676,183 A * | 10/1997 | Bravo | ................ | F16L 5/06 |
| | | | | 141/367 |
| 7,597,361 B2 | 10/2009 | Theilen | | |
| 8,028,718 B2 | 10/2011 | Tiberghien et al. | | |
| 9,787,070 B2 * | 10/2017 | DeCesare | ............ | F16L 41/14 |
| 2011/0031740 A1 * | 2/2011 | Stone | ................ | F16L 41/14 |
| | | | | 285/139.2 |
| 2020/0149667 A1 | 5/2020 | Collins | | |
| 2022/0316625 A1 * | 10/2022 | Kondrus | ............ | F16L 5/025 |

FOREIGN PATENT DOCUMENTS

| | | | | | |
|---|---|---|---|---|---|
| GB | 2125506 A | * | 3/1984 | ............ | F16L 5/06 |
| GB | 2613252 A | * | 5/2023 | ............ | F16L 5/06 |
| JP | 2001004069 A | * | 1/2001 | ............ | F16L 5/06 |
| KR | 890003128 Y1 | * | 5/1989 | ............ | F16L 5/06 |
| KR | 20180003128 U | | 11/2018 | | |

\* cited by examiner

FLUID FITTING COUPLERS AND COUPLING SYSTEM

CROSS-REFERENCE TO RELATED APPLICATIONS

This application claims the benefit of U.S. Provisional Patent Application No. 63/318,797, which was filed on Mar. 11, 2022. The entire content of the foregoing provisional application is incorporated herein by reference.

BACKGROUND

Engagement of blind fluid couplers to form leak free seals is not easily performed in automated or semi-automated systems. Misaligned couplers can cause leaks, can cause misalignment of components, and can cause interruptions in system operation in order to reposition misaligned components. Stack-up of tolerances within a system or hindrance in the movement of system components can also lead to misalignment of couplers and leaks between them. Cost effective fluid couplers that overcome these deficiencies have yet to be developed. Thus, a need exists for improved coupling systems that can correct for misaligned couplers or movement between couplers, thereby increasing reliability and success of connecting couplers together.

SUMMARY

Embodiments of the present disclosure provide fluid couplers that can be mated together to form a coupling system. The couplers accommodate for misalignment between adjacently positioned couplers to be coupled or fluidly connected together. The coupling system can include a first or female coupler assembly and a second or male coupler assembly that can be joined together. The first or female coupler assembly can be adapted to extend through an opening in a support structure. The second or male coupler assembly can include a coupler body that can be adapted to extend through an opening in a support structure. The coupler assemblies can each include a resilient gasket positioned over the respective coupler bodies and adapted for positioning against a first surface of the respective support and a resilient gasket positioned over the coupler body and adapted for positioning against a second opposing surface of the respective support. The first or female coupler assembly can be adapted to compress the gaskets against the first and second surfaces of a support, maintain the position of the female coupler, without sliding, within an opening in the support wall, and permit pivoting or deflection of the first or female coupler about a pivot formed in the support wall opening between the two resilient gaskets relative to the support wall. The female coupler can be adapted to compress the gaskets against the first and second surfaces of the support, maintain the position of the female coupler, without sliding, within an opening in the support wall, and permit pivoting or deflection of the female coupler in the opening relative to the support. The second or male coupler assembly can be adapted to compress the gaskets against the first and second surfaces of a support, maintain the position of the male coupler, without sliding, within an opening in the support wall, and permit pivoting or deflection of the second or male coupler about a pivot formed in the support wall opening between the two gaskets relative to the support. The male coupler assembly can be adapted to compress the gaskets against the first and second surfaces of the support and permit pivoting or deflection of the second or male coupler body in an opening in the support wall relative to the support. In some embodiments the resilient gasket can have an axial dimension that can be 1.5 times the radial dimension of the resilient gasket as measured through a cross section taken along the diameter of the resilient gaskets. In some embodiments, the gaskets can maintain a fluid tight seal between the coupler body and the one or more respective supports while permitting pivoting or deflection of the couplers relative to the respective openings and each other. Such pivoting or deflection allows for initial misalignment between the couplers, adjusts the position of the first or female coupler and/or the second or male couplers to adjust for the misalignment, and ensures a fluid tight seal between the couplers is created after seating of an extension of the second or male coupler within an opening of the first or female coupler.

Embodiments of the present disclosure can provide a coupling system that includes supports which can be walls of containers and the coupling system can accommodate for misalignment between adjacently positioned containers to be coupled. One container can include a female coupler and a second container can include a male coupler. Each of the female and male couplers can include a coupler body extending through an opening in the respective container walls, a resilient gasket positioned over the coupler body and against an inner surface of the respective container wall, and a resilient gasket positioned over the coupler body and against an outer surface of the respective container wall. The resilient gaskets can be compressed a sufficient amount against the container walls to maintain the position of the coupler body in the opening of the container wall, while permitting pivoting or deflection of the female and male couplers relative to the respective container walls and each other. The gaskets can maintain the position of the coupler in the opening of the container wall and can provide a barrier or fluid seal between the coupler body and the container wall while permitting pivoting or deflection of the female and male couplers between the gaskets and relative to the respective container walls and each other. This pivoting fluid seal enables pivoting or deflection of the coupler body and allows for initial misalignment between the female and male couplers on adjacent containers, adjusts the position of the female and male couplers to correct for the misalignment, and provides a fluid seal after seating of an extension of the male coupler within an opening of the female coupler. The couplers can be used in aeroponic and various hydroponic growing environments.

In accordance with embodiments of the present disclosure, a container coupling system is provided. The container coupling system includes a first container including a first wall defining an inner surface and an outer surface, and a first opening formed in the first wall. The container coupling system includes a second container including a second wall defining an inner surface and an outer surface, and a second opening formed in the second wall. The container coupling system includes a first coupler including a first coupler body extending through the first opening of the first container, a first gasket positioned over the first coupler body and against the inner surface of the first wall, and a second gasket positioned over the first coupler body and against the outer surface of the first wall. The first and second gaskets form a fluid tight seal between the first coupler body and the first wall while permitting pivoting of the first coupler relative to the first wall. The container coupling system includes a second coupler including a second coupler body extending through the second opening of the second container, a third gasket positioned over the second coupler body and against the inner surface of the second wall, and a fourth gasket positioned over the second coupler body and against the outer surface of the second wall. The third and fourth gaskets form a fluid tight seal between the second coupler body and the second wall while permitting pivoting of the second coupler relative to the second wall.

In accordance with embodiments of the present disclosure, a container that includes openings in opposing sidewalls and complementary couplers, e.g. male and female, positioned within the opposing sidewall openings with their respective coupling structures on the outer surface of the sidewalls is provided. Such containers can be coupled together end to end using the complementary couplers. The container can include a first wall defining an inner surface and an outer surface, and a first opening formed in the first wall. The container can include a second wall defining an inner surface and an outer surface, and a second opening formed in the second wall. The container includes a first coupler including a first coupler body extending through a first opening of a first container wall, a first resilient gasket positioned over the first coupler body and against the inner surface of the first wall, and a second resilient gasket positioned over the first coupler body and against the outer surface of the first wall. The mating feature of the first coupler complementary to the second coupler mating feature extends outwardly from the outer surface of the first wall. The first and second resilient gaskets fix the position of the first coupler body within the opening in the first wall while permitting pivoting of the first coupler relative to the opening in the first wall. The first and second resilient gaskets can form a fluid tight seal between the first coupler body and the first wall. The container includes a second coupler including a second coupler body that can mate with the complementary first coupler, the second coupler extending through the second opening of a second container wall opposite the first container wall, a third resilient gasket positioned over the second coupler body and against the inner surface of the second wall, and a fourth resilient gasket positioned over the second coupler body and against the outer surface of the second wall. The mating feature of the second coupler complementary to the first coupler mating feature extends outwardly from the outer surface of the second wall. The third and fourth resilient gaskets fix the position of the second coupler body within the opening in the second wall while permitting pivoting of the second coupler relative to the second wall. The third and fourth resilient gaskets can form a fluid tight seal between the second coupler body and the second wall.

Pivoting of the first coupler relative to the opening in the first wall of a support and pivoting of the second coupler relative to the opening in the second wall of a support facilitates engagement of the first coupler relative to the second coupler during misalignment of the first and second couplers during joining of the first and second couplers. The first coupler can include a first fastener, such as a nut in threaded engagement with the first coupler body, and the second coupler can include a second fastener, such as a nut in threaded engagement with the second coupler body. In some embodiments, the first fastener compresses the first and second gaskets against the first coupler body and the first wall, and the second fastener compresses the third and fourth gaskets against the second coupler body and the second wall. In some embodiments, the first fastener of the first coupler can partially compresses the first and second gaskets into the first opening of the first wall, and the second fastener of the second coupler can partially compresses the third and fourth gaskets into the second opening of the second wall.

The first coupler assembly or female coupler assembly 102 (see, e.g., FIG. 2 and FIG. 3) can include a first coupler body or female coupler 110, two resilient gaskets 112, 114, and a fastener such as but not limited to a nut 116. The first coupler body can include an opening extending therethrough. The opening can include a tapered opening section 144 at a first end of the first coupler body. The first coupler body can include a passage or opening 142 extending therethrough from the first end 120 to a second end 122. The opening at the first end can include a chamfered, beveled or tapered opening section extending through at least a portion of a first section from the first end. The outer surface of the first coupler body includes a first section 124, which in some embodiments can be a radial flange, extending from the first end 120 towards a second end 122 of the first coupler body 110. The outer surface of the first coupler body can include a second section 126 extending from the second end 122 of the coupler body towards the first end 120 of the first coupler body. The outer surface of the first coupler body can include an intermediate section 128 disposed between the first section 124 and the second section 126. A diameter of the first section 124 of the outer surface of the first coupler body can be dimensioned greater than a diameter of the second section 126 and intermediate section 128, and the diameter of the intermediate 128 section can be dimensioned greater than the diameter of the second section 126. The intermediate section can include threads. The second section 126 of the outside surface of the first coupler body can include threads 138 on an outer surface or other fitting at the end 122 for joining the coupler body 110 with complementary threads or other fittings of an optional conduit or optional fluid distribution manifold. The optional conduit in some embodiments can be a nutrient solution distribution manifold with sprayers for aeroponic plant development. In some other embodiments the optional conduit can distribute liquid into a container for hydroponic plant development. The first coupler assembly can include a first washer disposed about the first coupler body 110. The first coupler can include a first washer 118 disposed about the first coupler body between the first fastener or nut 116 and a first resilient gasket 112. The first coupler can include a second resilient gasket 114 disposed about the coupler body between the radial flange 124 and the first resilient gasket 112.

The second coupler or male coupler assembly 106 (see, e.g., FIG. 4 and FIG. 5) can include a second coupler body or male coupler body 176, two resilient gaskets 178 and 180, and a fastener such as but not limited to nut 182. The second coupler body 176 includes a passage or opening 222 extending therethrough from the end 188 to the end 190. The opening 222 can include a first opening section 224 extending through at least a portion of a first section 186 from the first end 188 towards the second end 190, and a second opening section 226 extending through a second section 194, a radial flange section 196, an intermediate section 192, and partially through the first section 186. The outer surface of the second coupler body 176 can include a first section 186 extending from a first end 188 towards a second end 190, a second section 194 extending from the second end 190 towards the first end 186, an intermediate section 192 disposed adjacent to the first section 186, and a radial flange section 196 disposed between the second section 194 and the intermediate section 192. The diameter of the radial flange 196 can be dimensioned greater than a diameter of the intermediate section 192, the first section 186, and the second section 194. The diameter of the intermediate section 192 can be dimensioned greater than the diameter of the first section 186 and the second section 194. The second section 194 of the second coupler body or male coupler body can include at least one radial groove 214 and a sealing element 218 can be disposed within the at least one radial groove. The at least one sealing element can create a fluid tight seal between the first coupler body and the second coupler body. The second section 194 of the second coupler body includes a tapered edge 212 at the second end 190 to assist with alignment or engagement with the tapered opening section of the first coupler body. The second coupler assembly can include a washer 184 disposed between the fastener 182 and the third resilient gasket 180. The second coupler or male coupler assembly can include a fourth resilient gasket 178 disposed between the radial flange 196 and the third gasket. The second coupler body 176 includes an opening extending therethrough. The first section 186 of the second coupler body 176 can include threads or other fitting on an outer surface to join the second coupler body 176 with complementary threads or fittings of an optional conduit or optional fluid distribution manifold. The optional conduit in some embodiments can be a nutrient solution distribution manifold with sprayers for aeroponic plant development. In some other embodiments the optional conduit can distribute liquid into a container for hydroponic plant development.

In accordance with some embodiments of the present disclosure, a method of joining couplers that can mate with each other is provided. The method includes providing a first support which can be a container; the first support or container including a first wall defining an inner surface and an outer surface, and a first opening formed in the first wall. The method includes providing a second support which can be container; the second support or container including a second wall defining an inner surface and an outer surface, and a second opening formed in the second wall. The method includes mounting a first coupler relative to the first support or container. The first coupler includes a first coupler body extending through the first opening of the first support or container, a first gasket positioned over the first coupler body and against the inner surface of the first wall, and a second gasket positioned over the first coupler body and against the outer surface of the first wall. The first and second resilient gaskets can fix the position of the first coupler body in the opening the first wall while permitting pivoting of the first coupler relative to the opening in the first wall. In some embodiments the first and second gaskets can fix the position of the coupler in the opening of the first wall and form a fluid seal between the first coupler body and the first wall while permitting pivoting of the first coupler relative to the opening in the first wall. This pivoting fluid seal enables the first coupler to pivot or deflect while maintaining a fluid seal, with the coupler body and the support. The method includes mounting a second coupler relative to the second support or second container. The second coupler includes a second coupler body extending through the second opening of the second support or second container, a third gasket positioned over the second coupler body and against the inner surface of the second wall, and a fourth gasket positioned over the second coupler body and against the outer surface of the second wall. The third and fourth gaskets form a fluid seal between the second coupler body and the second wall while permitting pivoting of the second coupler relative to the second opening of the second wall. This pivoting fluid seal enables the second coupler to pivot or deflect while maintaining a fluid seal, with the coupler body and the support. The method includes positioning the first and second couplers configured with their respective support or container walls in a facing relationship. The method can include pivoting at least one of the first coupler relative to the first wall or the second coupler relative to the second wall during engagement between the first coupler and the second coupler to overcome misalignment between the first coupler and the second coupler.

The method includes tightening a first nut against the first gasket and tightening a second nut against the third gasket. In some embodiments, tightening the first nut against the first gasket compresses the first and second gaskets against the first coupler body and the first wall of the support or container. Tightening the second nut against the third gasket compresses the third and fourth gaskets against the second coupler body and the second wall of the support or container. In some embodiments, tightening the first nut against the first gasket partially compresses the first and second gaskets into the first opening of the first wall, and tightening the second nut against the third gasket partially compresses the third and fourth gaskets into the second opening of the second wall.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION

Aeroponic farming methods of plant production generally involves spraying a liquid nutrient solution on the roots of developing plants protruding through a growth media. In hydroponic farming for plant production, developing plants can be positioned in rafts with openings and the roots of developing plants are suspended into a solution of nutrient-rich, oxygenated water. In both aeroponic and hydroponic methods, the plants are supplied with light from a suitable source above the plants to promote photosynthesis and plant development.

In embodiments of the disclosure the term fluid can refer to either a gas or a liquid. Liquids can include aqueous based solutions, organic solvents, and the like. In some embodiments the liquid can be a nutrient solution, water, or sanitizing solution for removing biofilms from hydroponic and aeroponic growing systems. In other embodiments the fluid can be a gas. The gas can be used for flushing, cleaning, or drying conduits and equipment surfaces.

In embodiments of the disclosure, the first coupler assembly, the second coupler assembly, or both, can be secured to one or more supports. The support can have one or more opening(s) that the coupler body can be positioned through. The support can be a wall, a flange, a handle connected to a support, or other interface with an opening(s) that can accept the coupler body and can act as a support for a coupler assembly utilizing the compressible and resilient gaskets.

Figure 1:
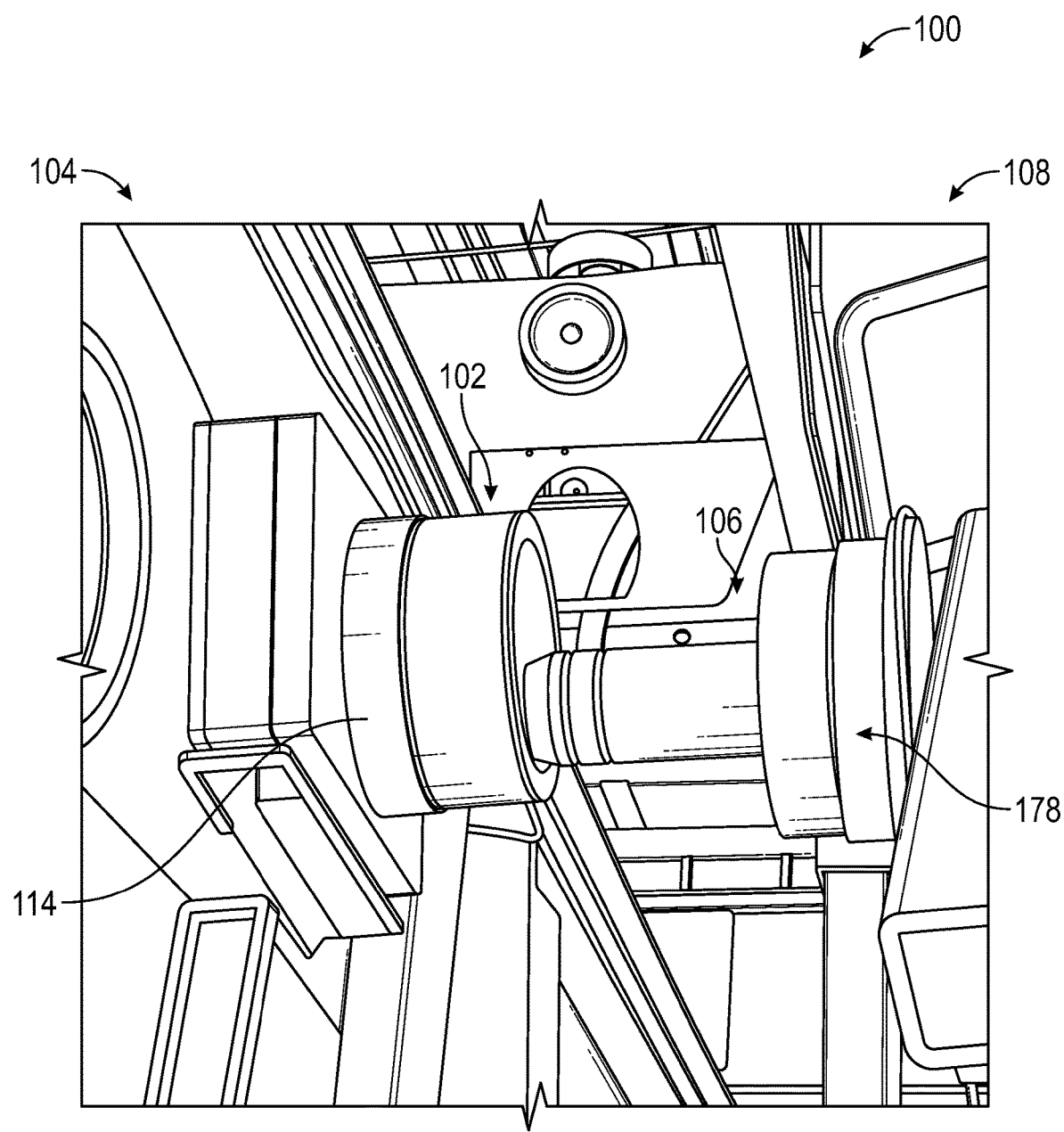
FIG. 1 is a perspective view of an embodiment of adjacent separated first and second couplers of the present disclosure.

FIG. 1 is a perspective view of an embodiment of the disclosure illustrating portions of adjacent separated first coupler assembly 102 and second coupler assembly 106 of the present disclosure prior to engagement with each other. The first coupler can include a resilient gasket 114 against a surface of a first support wall and the second coupler can include a resilient gasket 178 on a surface of a second support wall. When the first coupler assembly 102 and second coupler assembly 106 are engaged or mated together, a coupling system 100 can be formed. In some embodiments where the first coupler and the second coupler are positioned and secured in openings of supports that form walls of different containers (e.g. 104 and 108), the couplers 102 and 106 can be mated together to form a coupling system 100 for the containers. The coupling system 100 for containers can be used with a series of containers in aeroponic or hydroponic growth systems. The coupling system 100 includes a female coupler 102 secured or mounted to one wall of a first container 104 and a male coupler 106 secured or mounted to an opposing wall of a second container 108. The female coupler and male couplers 102, 106 can engage with each other to create a fluid tight seal between the containers 104, 108. As will be discussed in greater detail below, the exemplary design and configuration of the male and female couplers 102, 106 accommodates a larger degree of misalignment between the female and male couplers 102, 106, resulting in higher reliability and success of connection between the containers 104, 108. The male and female couplers with the opposing elongated resilient gasket seals in embodiments of the disclosure do not translate or slip within the opening of a support wall or container wall opening. This helps maintain alignment and centering of a chain of containers and provides more flexibility than fixed connectors without any flexibility.

Figure 2:
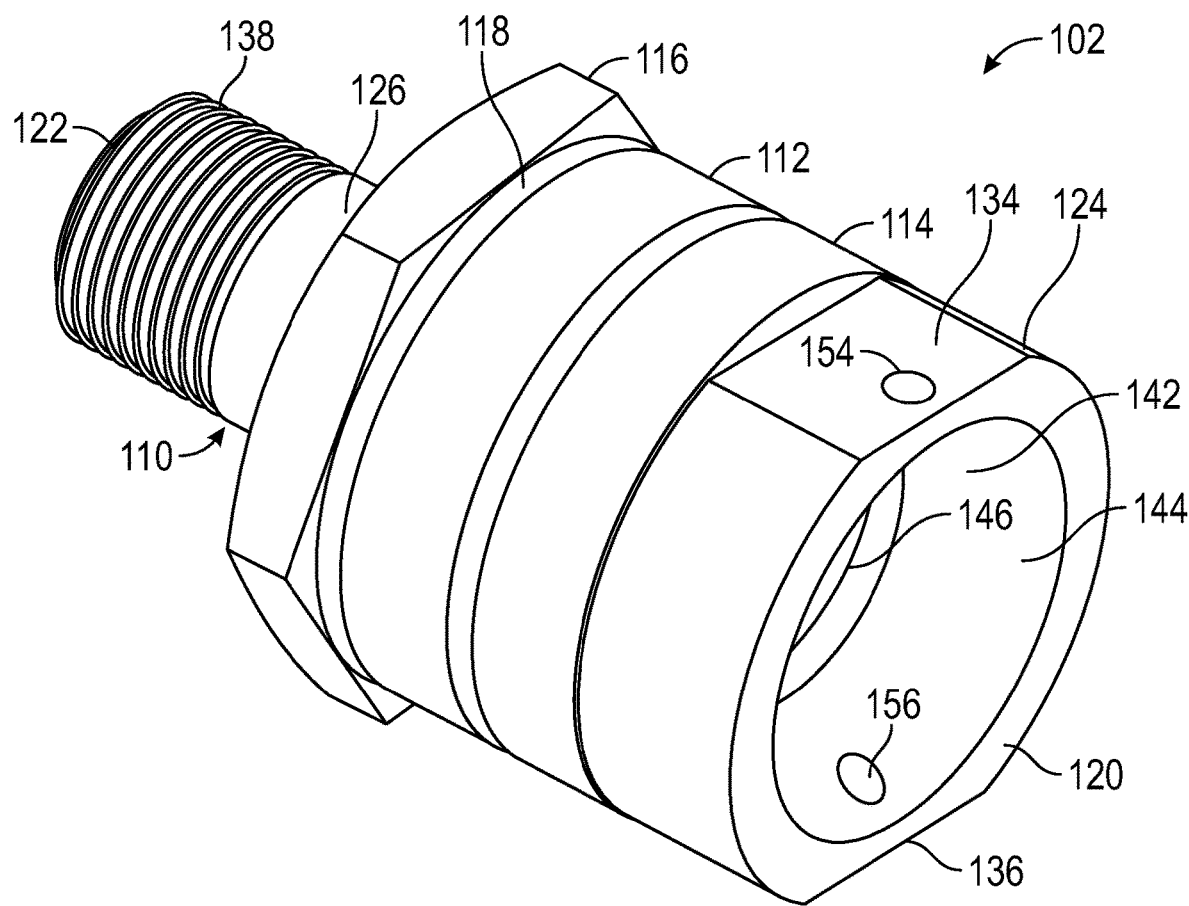
FIG. 2 is a perspective view of an embodiment of a first or female coupler assembly of the present disclosure.
Figure 3:
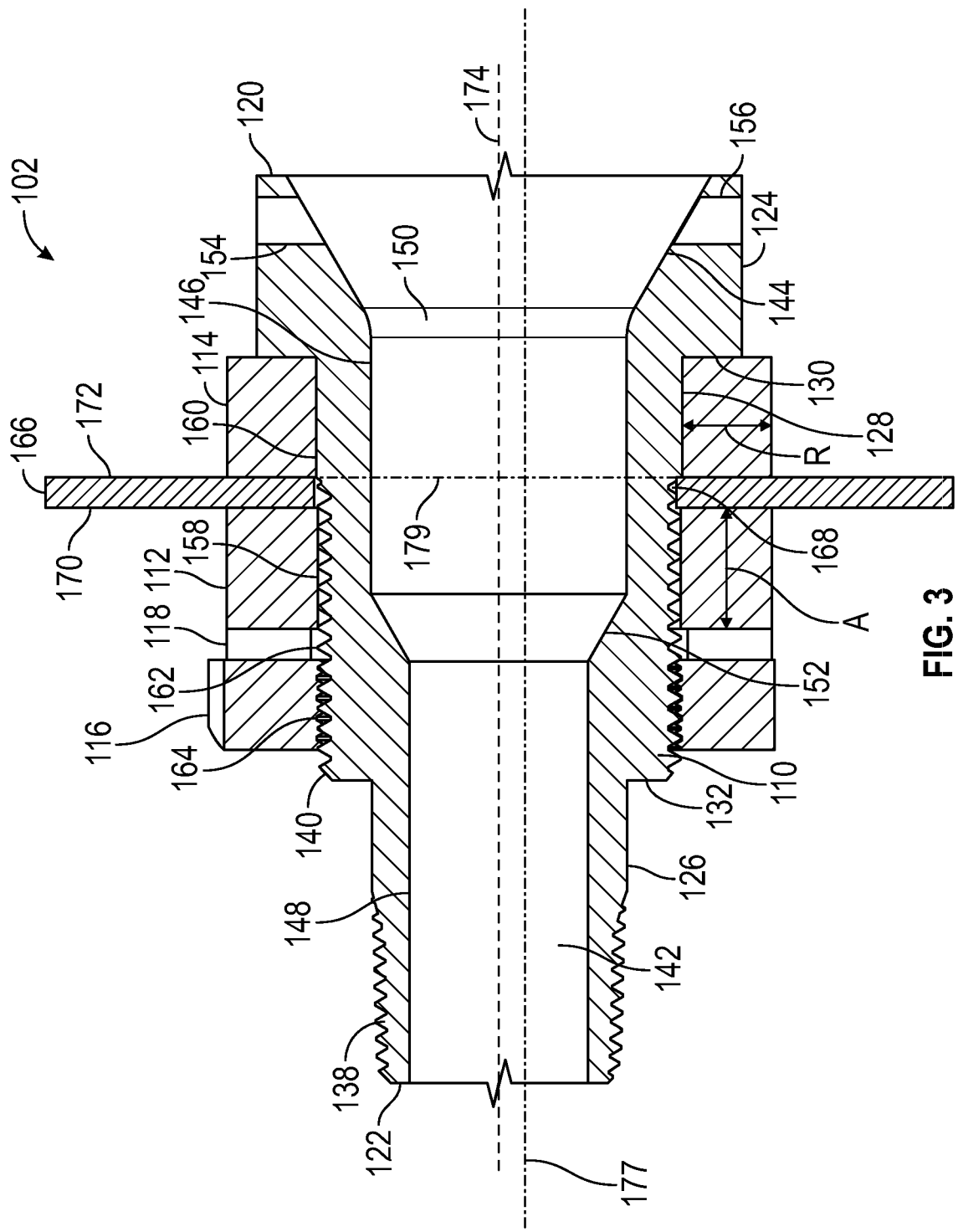
FIG. 3 is a cross-sectional view of an embodiment of a first or female coupler assembly of the present disclosure mounted relative to a first wall of a first support or container.

FIGS. 2 and 3 show perspective and cross-sectional views of a first coupler or a female coupler 102 in an embodiment of the disclosure. The assembly of the female coupler 102 can include a coupler body 110, two resilient gaskets 112, 114, and a fastener such as a nut 116. In some embodiments, the female coupler 102 can include a washer 118 positioned between the nut 116 and one of the gaskets 112. The coupler body 110 includes first and second opposing ends 120, 122. The coupler body 110 includes a first section 124 (e.g., a radial flange) at end 120 and extending towards end 122, a second extension or section 126 at end 122 and extending towards end 120, and an intermediate section 128 disposed between the first and second sections 124, 126.

In some embodiments, each of the first section 124, second section 126, and intermediate section 128 can define a cylindrical or substantially cylindrical configuration. The first section 124 can define an outer diameter dimensioned greater than an outer diameter of the second and intermediate sections 126, 128, and the intermediate section 128 can define an outer diameter (e.g., about 1.5 inches) dimensioned greater than an outer diameter of the second section 126 (e.g., about 1.05 inches). The difference in diameters between different sections can form a radial step 130 between the first and intermediate sections 124, 128, and a radial step 132 between the intermediate and second sections 128, 126. In some embodiments the diameter of the first section 124 can be the same as the diameter of the resilient gasket 114 (excluding regions on first section 124 where wrench flats 134 and 136 can be formed in portions of the first section 124).

The outer surface of the first section 124 can include two flat opposing surfaces 134, 136 to facilitate gripping of the coupler body 110 with a tool (e.g., wrench) during assembly. The outer surface of the first section 124 can be free of threads. The outer surfaces of the second and intermediate sections 126, 128 can include threads 138, 140. In some embodiments, the threads 138 of the second section 126 can be formed on only a portion of the second section 126 (e.g., threads 138 covering or formed in a portion of the outer surface from the end 122 towards the radial step 132). In some embodiments, the entire outer surface of the second section 126 can include threads 138. In some embodiments the second section 126 can have a coupling or fitting in place of threads for joining to a nutrient manifold or distribution line. In operation, the threads 138 can engage with corresponding threads of a nutrient solution distribution manifold or other fluid distribution conduit within a container. In some embodiments, the threads 140 of the intermediate section 128 can be formed on only a portion of the intermediate section 128 (e.g., threads 140 covering or formed in a portion of the outer surface from the radial step 132 towards the radial step 130). In some embodiments, the entire outer surface of the intermediate section 128 can include threads 140.

The coupler body 110 can include a passage or opening 142 extending therethrough from the first end 120 to the second end 122 of the first coupler body 110 or female coupler assembly 102. The opening 142 can include a chamfered, beveled or tapered opening section 144 extending through at least a portion of the first section 124 from the end 120. The angle of the tapered opening section 144 as measured relative to a central longitudinal axis 174 of the coupler body 110 can be, e.g., between about 20° and about 40°, about 25° to about 35°, about 26° to about 34°, about 27° to about 33°, about 28° to about 32°, about 29° to about 31°, about 25°, about 26°, about 27°, about 28°, about 29°, about 30°, about 31°, about 32°, about 33°, about 34°, about 35°, or the like. The tapered opening section 144 can connect with a uniform diameter intermediate opening section 146 that extends at least partially through the intermediate section 128. The intermediate opening section 146 connects with a uniform diameter end opening section 148 that extends through the second section 126 to the end 122.

The opening 142 defines a diameter at the end 120 that is dimensioned greater than the diameter of the intermediate opening section 146. In some embodiments, the diameter of the opening 142 can be about 1.76 inches at the end 120, and tapers to a diameter of about 1.07 inches at the connection 150. The diameter of the intermediate opening section 146 (e.g., about 1.065 inches) is dimensioned greater than a diameter of the end opening section 148 (e.g., about 0.74 inches). In some embodiments, the connection 150 between the tapered opening section 144 and the intermediate opening section 146 can be curved or rounded. In some embodiments, the connection 152 between the intermediate opening section 146 and the end opening section 148 can be tapered, thereby gradually reducing the diameter of the opening 142. In some embodiments, the first section 124 can include apertures 154, 156 that extend perpendicularly from opposing outer surfaces of the first section 124 into the opening 142 through the tapered opening section 144. A pin (not shown) can be inserted through the openings 154, 156 to retain a plug or blind fitting to block and stopper the opening 142 to fluid flow.

The resilient gaskets 112, 114, 178, 180 in embodiments of the disclosure can be fabricated from compressible and resilient rubber or elastomeric materials. The compressible and resilient gasket 112, 114, 178, 180 elastomeric materials can include polyurethane ("urethane"), silicone, and neoprene. The resilient gaskets can have an opening through the thickness of the gasket 112, 114, 178, 180 that can accommodate and surround a portion of the coupler body 110, 176. The compressible and resilient material allows compression of portions of the gasket 112, 114, 178, 180 to accommodate misaligned couplers and the resiliency of the material enables the gaskets 112, 114, 178, 180 to substantially return to their original shape, and the couplers 110, 176 to pivot relative to their original or natural position during alignment of the couplers. The compressible and resilient material also allows the couplers to substantially return to their original or natural position after the couplers have been separated. This resiliency can eliminate or substantially reduce the need to manually realign containers or coupler bodies.

Figure 6:
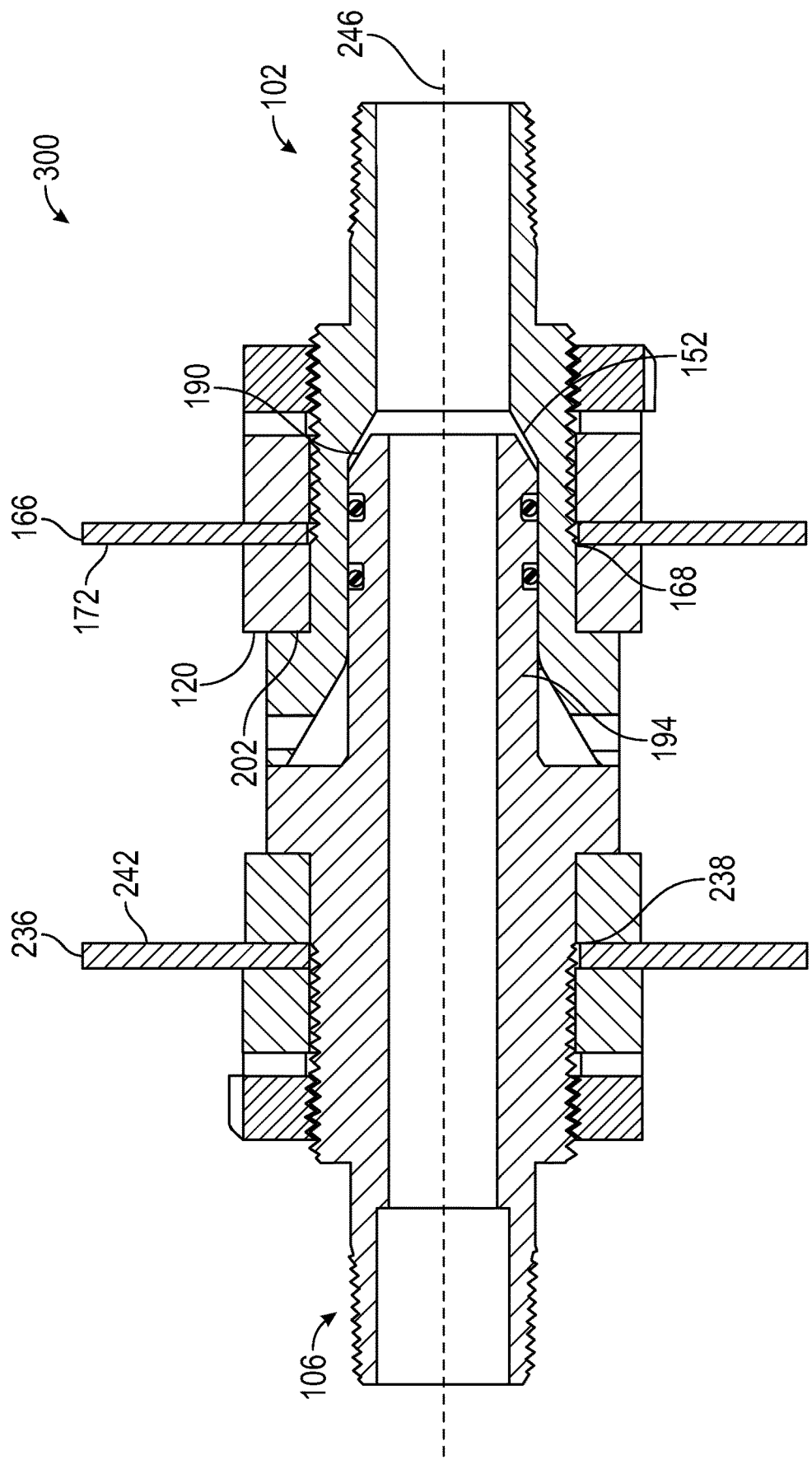
FIG. 6 is a cross-sectional view of an embodiment of a coupling system including joined first and second coupler assemblies of the present disclosure.

The gasket material can have a Shore Durometer hardness of between about 30 and 50, or between 30 and 50, as determined by the ASTM D2240 standard using Shore A testing. In some embodiments the Shore Durometer hardness of the gasket material can be between about 38 and about 42, or between 38 and 42. The hardness of the resilient gasket can be chosen to enable the coupler body assembly to maintain its position and reversibly pivot in a support opening with the gaskets on either side of the support (e.g. as illustrated in FIG. 6 with supports 166 and 236), the coupler body passing through an opening of each gasket, and the fastener compressing the gaskets an amount that retains their resiliency and forms a fluid seal between the gaskets and support surfaces about the opening. In some embodiments, the hardness of the resilient gasket can be chosen such that the fastener of the coupler assembly can preload or compress the gaskets an initial amount to hold the gaskets in place against the support, form pivoting fluid seals by contact of the gasket surfaces with the support surfaces and that allow the coupler body to reversibly pivot about the support opening while maintaining the position of the coupler body within the support opening. In some embodiments the fastener can preload or compress one or both gaskets between about 10% to about 15% of the gasket thickness against the support surface to hold the gaskets in place against the support, form pivoting fluid seals by contact of the gasket surfaces with the support surfaces that allow the coupler body to reversibly pivot about the support opening while maintaining the position and seals of the coupler body within the support opening.

A cross section of the compressible and resilient gasket can be elliptical, rectangular, or other shape suitable for contacting and sealing with a support surface and washers or radial flange of the coupler body. In some embodiments, the cross section of the gasket can be rectangular and the axial dimension (parallel with the coupler body axis, see "A" in FIG. 3 and FIG. 5) of the gasket is greater than the radial dimension of the gasket (perpendicular with the coupler body axis, see "R" in FIG. 3 and FIG. 5). In some embodiments, the axial dimension of the gasket can be 1.5 times to 2 times the radial dimension. Gaskets having a rectangular cross section with an axial dimension greater than the radial dimension can provide sufficient area for the gasket to reversibly deform under a pivoting force of the coupler body and to restore the gasket and the coupler body to a resting position (e.g. perpendicular to the support surface) after the pivoting force has been removed. In some embodiments, the cross-section of the gasket can be dimensioned such that the entire surface area of one side of the gasket is positioned against the radial step 130 of the section 124 to ensure that the entire surface area of the gasket forms the seal.

Figure 5:
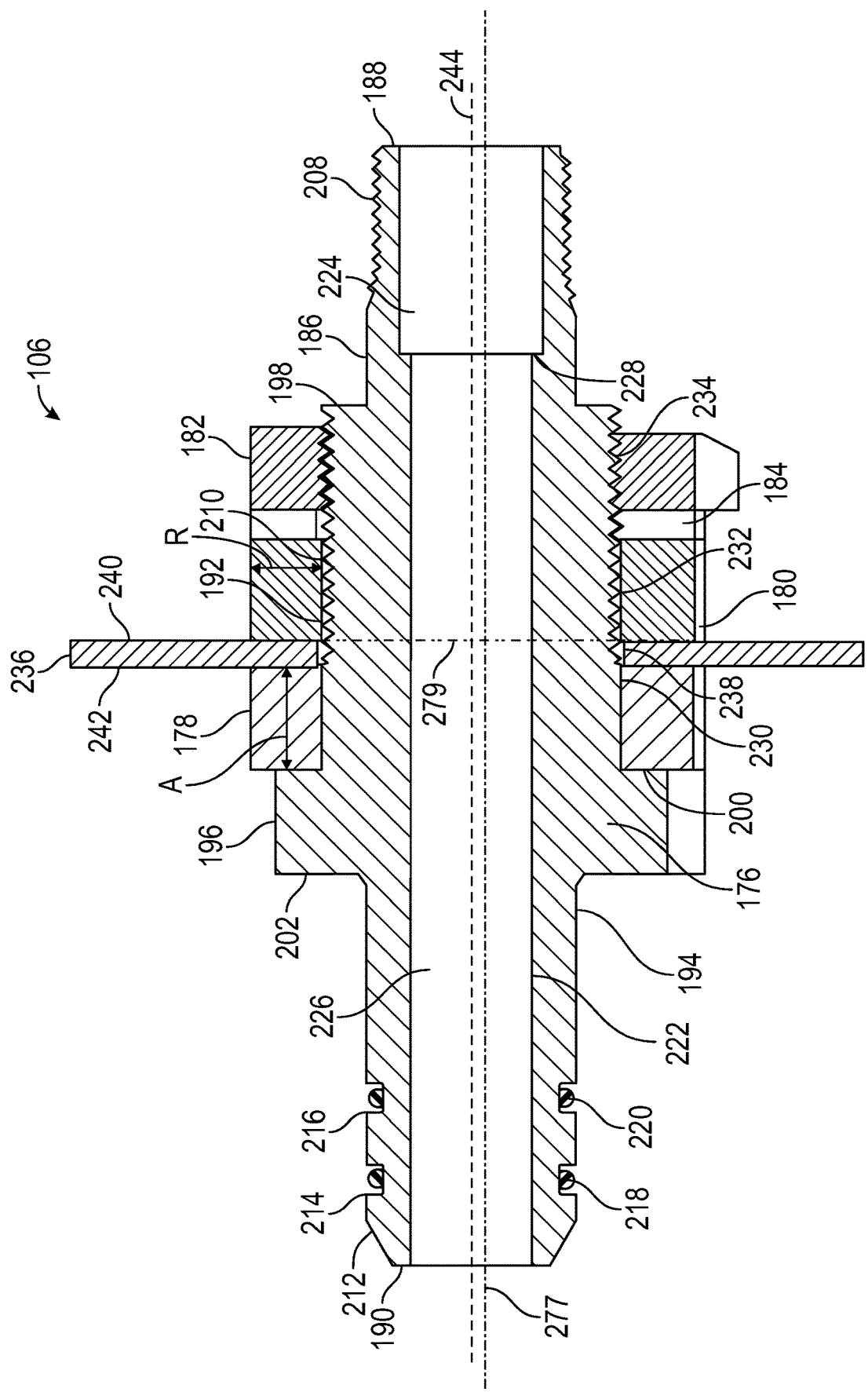
FIG. 5 is a cross-sectional view of an embodiment of a second or male coupler assembly of the present disclosure mounted relative to a second wall of a second support or container.

The thickness of the resilient gaskets can be between about 0.3 inches and about 0.5 inches (the thickness of the gasket is shown as the axial dimension "A" as illustrated in FIG. 3 and FIG. 5). In some embodiments the thickness of each gasket can be between about 0.35 inches and about 0.45 inches. In still some other embodiments the thickness of each gasket can be about 0.4 inches or 0.4 inches. In still some other embodiments, the thickness of each gasket can be between about 0.3 inches and about 0.75 inches, or about 0.3 inches and about 1 inch. In some embodiments, the thickness of each gasket can be specifically selected based on the amount of deflection desired by the couplers (e.g., a greater thickness to accommodate greater deflection, and a smaller thickness to reduce deflection). The resilient gaskets positioned on either side of the support opening and about the coupler body as illustrated in FIG. 3 and FIG. 5 can be pre-loaded or pre-compressed against the support wall by a force provided by the fastener(s). The amount of force applied by the fastener to the gaskets of a coupler to pre-load or pre-compress the gaskets can be an amount that reduces the overall thickness of the gaskets by less than 40 percent compared to the thickness of the un-compressed or non-preloaded gaskets. The amount of force applied by the fastener to the gaskets of a coupler to pre-load or pre-compress the gaskets can be in an amount that reduces the overall thickness of the gaskets by between 10 percent and 15 percent compared to the thickness of the uncompressed or non-preloaded gasket. A smaller pre-load that forms a liquid seal can reduce permanent gasket deformation, maintain gasket resiliency, improve pivoting reversibility, improve coupler pivoting range of motion, and increase the number of cycles a coupler can pivot.

The gasket can have a shape that covers the portion of the support surface surrounding the opening with sufficient overlap between the gasket and support surface to make a liquid seal when the gaskets are pre-loaded or pre-compressed to between 10-15% of their axial dimension against the support. The gaskets can have a shape of a geometric solid with an opening through the solid that can accommodate a portion of the coupler body, e.g. a hollow geometric solid, hollow rectangular cuboid, hollow cylinder, and the like. In some embodiments, the gasket can be a hollow cylinder with a cylindrical opening. In some embodiments, the gasket can have a donut or torus shape.

Fasteners can be used to pre-compress or pre-load the gaskets in embodiments of the disclosure. The fasteners can include nuts, nut-washer assemblies, a latch clamp, a flange, a strap and ratchet, a retaining ring, and the like. Pre-loading the compressible and resilient gaskets by application of force through fasteners such as 116 and 182 can form pivoting fluid seal(s) between the gaskets, the radial flanges 124 and 196 of the coupler bodies and the support surfaces that prevent or reduce fluid leaks while still allowing for reversible pivoting of the coupler bodies such as 110 and 176 about a plane of the openings. Reversible pivoting of a coupler body can result when a force moves an end of the coupler away from its center or resting position and further compresses a portion or side of the preloaded gasket while permitting expansion of the preloaded gasket in the opposite portion of the gasket while still maintaining full or partial contact of the gasket with the support surface or radial flange.

Figure 7A:
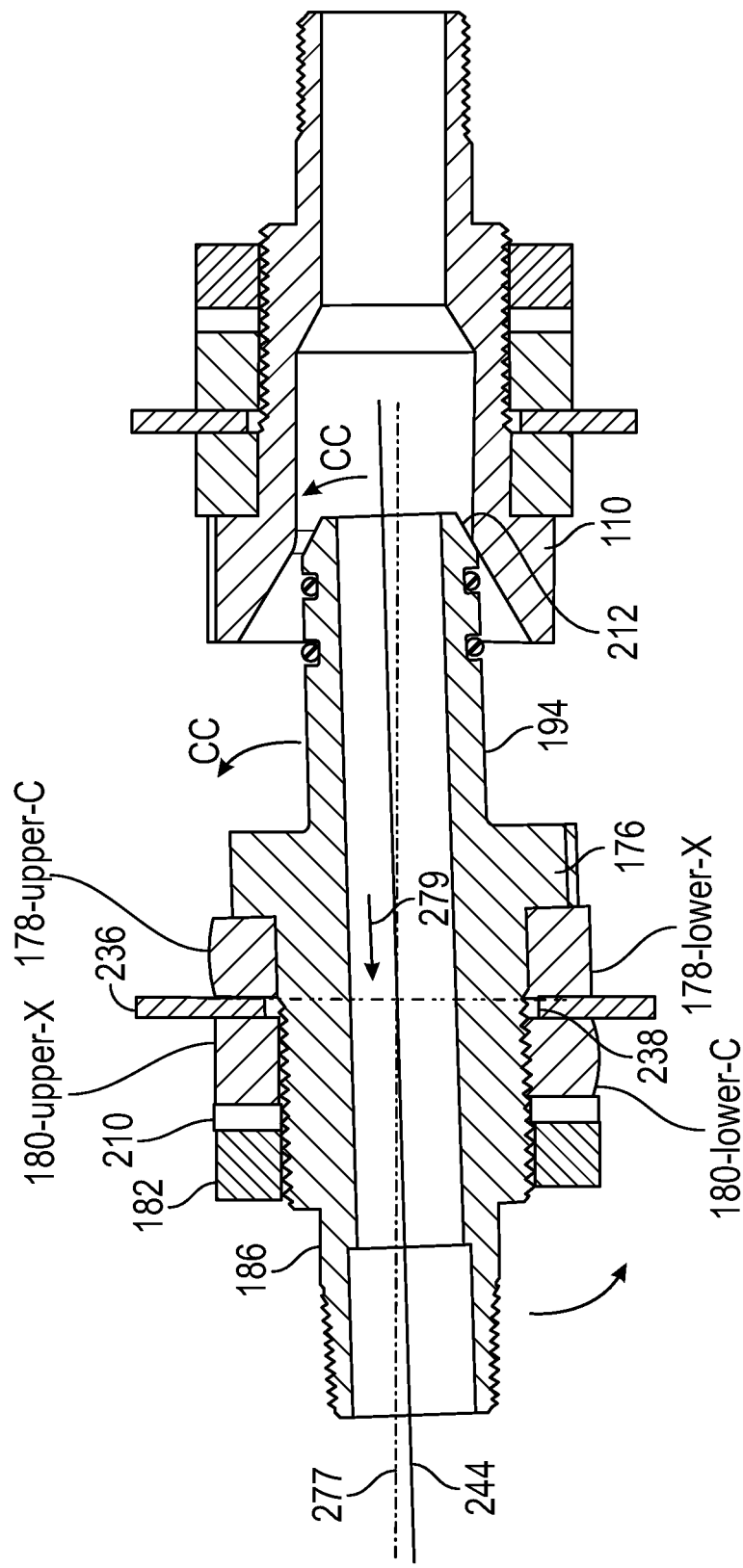
FIGS. 7A-B are cross-sectional views of an embodiment of a coupling system illustrating initial engagement of female coupler assembly and male coupler assembly, and pivoting of at least one coupler body in a counterclockwise direction (FIG. 7B) and a clockwise direction (FIG. 7A).
Figure 7B:
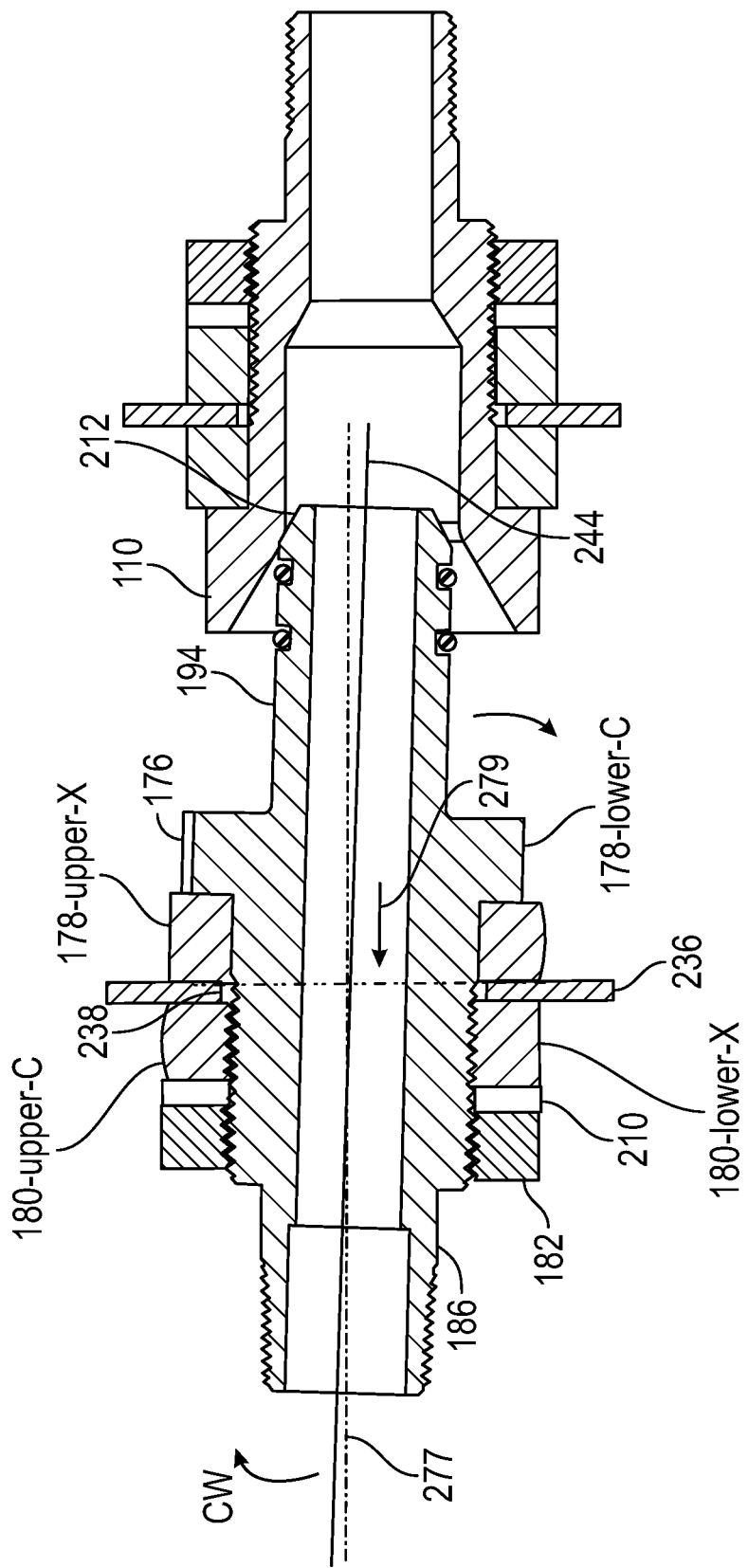

Reversible pivoting of a male coupler body 176 about an opening 238 in a support 236 is illustrated in part in FIGS. 7A and 7B. In FIG. 7A the male coupler body 176 is depicted as pivoting in a counter clockwise "CC" direction about the intersection of the plane of the support opening 238 and coupler body axis 244 while in FIG. 7B, the coupler body is depicted as pivoting in a clockwise "CW" direction about the intersection of the plane of the opening 238 and coupler body axis 244. The coupler body 176 can reversibly pivot in any other direction (into and out of the plane of the page, not shown) tracing a cone within which the coupler body can be pivoted.

FIG. 7A depicts a force being applied to the chamfered radial surface 212 of male coupler body 176 through contact with tapered opening section 144 of female coupler body 110 that results in the coupler body 176 pivoting in a counter clockwise (CC) direction. As a result of pivoting, the upper portion of gasket 178 can be further compressed from its pre-loaded state, "178-upper-C", which can be depicted with a rounded or convex shaped outer side portion due to additional compression of the gasket caused by the force pivoting the coupler body 176. In FIG. 7A the pivoting of the coupler body 176 results in the lower portion of gasket 178, "178-lower-X", expanding from its pre-loaded configuration which is depicted with a flat, non-rounded outer side portion in nearly full contact, or in full contact, with support 236 surface and radial flange surface. In FIG. 7A, the pivoting of the coupler body 176 results in the upper portion of gasket 180, "180-upper-X", expanding from its pre-loaded configuration. The gasket expansion is depicted with a flat, non-rounded outer side portion in nearly full contact, or in full contact, with support 236 surface and gasket 210 surface. After removal of the pivoting force from the coupler body the elastic energy stored in the portion of gasket "178-upper-C" in FIG. 7A can return (by expanding) the coupler body 176 back down to an un-pivoted or neutral position (e.g. see FIG. 5). Also, the elastic energy stored in resilient gasket "180-lower-C" by the pivoting of coupler body 176 can also act (by expanding), and thereby cooperate with gasket "178-upper-C", to return coupler body 176 back to an un-pivoted or neutral position.

In FIG. 7B a force applied to the chamfered radial surface 212 of coupler body 176 results in the coupler body 176 pivoting in the opposite or a clockwise ("CW") direction. In FIG. 7B the pivoting of the coupler body 176 results in the upper portion of gasket 178, "178-upper-X", expanding from its pre-loaded configuration which is depicted with a flat, non-rounded outer side portion in nearly full contact, or in full contact, with support 236 surface and radial flange surface. In FIG. 7B, the pivoting of the coupler body 176 results in the lower portion of gasket 180, "180-lower-X", expanding from its pre-loaded configuration. The gasket expansion is depicted with a flat, non-rounded outer side portion in nearly full contact, or in full contact, with support 236 surface and gasket 210 surface. In FIG. 7B, as a result of the clockwise pivoting of coupler body 176, the lower portion of gasket 178, "178-lower-C", is depicted with a rounded (outward expansion) or convex shaped outer side portion due to additional compression caused by the force pivoting the coupler body 176. The elastic energy stored in the portion of gasket "178-lower-C" in FIG. 7B can return the coupler body 176 back up to an un-pivoted or neutral position (e.g. see FIG. 5) when the force applied to the chamfered radial surface 212 is removed. The elastic energy stored in gasket "180-upper-C" by the pivoting can also act (by expanding), and thereby cooperate with gasket "178-Lower-C", to return coupler body 176 back to an un-pivoted or neutral position.

FIG. 7A and FIG. 7B illustrate pivoting of the male coupler body 176 about the opening 238. Opening axis 277 can be depicted as being perpendicular to a support 236 surface plane 279 and can be parallel (FIG. 5) or co-linear with coupler central longitudinal axis 244 when the coupler body 176 is not pivoted. When coupler body 176 pivots due to a force being applied to the coupler body 176, the coupler central longitudinal axis becomes non-parallel with the opening axis which can be in an amount of up to 7 degrees. In some embodiments, the non-parallel positioning can be between about 3 degrees to about 10 degrees. Similar pivoting of the female coupler body 110 can occur and be described by support opening axis 177, opening plane 179, and female coupler body central longitudinal axis 174. For example, force applied by the chamfered radial surface 212 against the inner surfaces of the opening in the female coupler body 110 can result in at least partial pivoting of the female coupler body 110 to accommodate the misalignment of coupler body 176, ensuring a seal is formed between the coupler bodies 110, 176.

In some embodiments the amount of pre-loading or pre-compression that the gaskets such as 112, 114, 178, and 180 are subject to by the fasteners can form a pivoting fluid seal between the coupler assembler body portions, gaskets, and support wall which allows for pivoting of the coupler about a plane of the support opening and restricts or prevents movement or sliding of the gaskets and/or coupler body side to side within the opening, and prevents or reduces fluid leaks. Fixing the position of the coupler body within the support opening, while allowing the coupler body to freely pivot, eliminates the need for repositioning or centering of the coupler body in the opening during use. Further, the coupler body can be held within the opening such that a constant or substantially constant length of the coupler body protrudes from either side of the support wall. This can improve operating efficiency and reduce downtime for correcting dislodged fittings.

The gaskets 112, 114, 178, 180 can be fabricated from compressible and resilient materials. Each gasket 112, 114, 178, 180 can define a shape that creates a fluid seal about the opening in the container or other mounting flange when pre-compressed by the fastener or nut 116, 182. In some embodiments, the gaskets 112, 114, 178, 180 can overlap a portion of the opening in the support. In some embodiments, the resilient and compressible gaskets 112, 114, 178, 180 can have a hollow cylindrical shape. In some embodiments, the hollow cylindrically shaped gaskets can have a rectangular cross section when uncompressed. In some embodiments, the gaskets 112, 114, 178, 180 radial cross section dimension ("R" in FIG. 3 and in FIG. 5) can be less than the axial cross section dimension ("A" in FIG. 3 and in FIG. 5) of the gasket. The compressible and resilient gaskets 112, 114, 178,

180 can provide a liquid seal between the support and coupler body once the gaskets are pre-compressed using the fastener 116, 182.

The diameter of the gasket openings 158, 160 can be dimensioned to accommodate the diameter of the intermediate section 128 of the coupler body 110 and form a fluid seal against the intermediate section. In some embodiments of the compressible and resilient gaskets 112, 114 the diameter of the respective openings e.g. 158, 160, can be dimensioned substantially equal to or slightly greater than the diameter of the intermediate section 128 of the female coupler body 110. The gasket openings 158, 160 can be the same, slightly smaller or slightly larger than the support opening 168. The washer 118 includes an opening 162 with a diameter dimensioned substantially equal to or slightly greater than the diameter of the intermediate section 128 of the female coupler body 110. The fastener 116 can include an opening 164 and can further include optional inner threads complementary to the threads 140 of the intermediate section 128. A force can be applied by the fastener 116 to optional washer 118 and to the gaskets 112, and 114, to pre-compress them against the support surfaces and radial flange 124. Where the fastener 116 is a nut, or a nut with an integral washer, the nut with the optional threads can be engaged with and threaded onto the intermediate section 128 to compress the gaskets. The compressible and resilient gaskets 112, and 114 can provide a liquid seal between the support surfaces and coupler body once the gaskets are pre-compressed using the fastener 116.

The gaskets 178, 180 of the male coupler assembly 106 can be substantially similar to the gaskets 112, 114 of the female coupler assembly 102, and each gasket can include opening 230, 232 extending through the respective gasket. In some embodiments, the radial cross section dimension of the gaskets 178, 180 ("R" in FIG. 5) can be less than the axial cross section dimension ("A" in FIG. 5) of the gasket. The diameter of the opening 230, 232 in the gaskets can be dimensioned substantially equal to or slightly greater than the diameter of the intermediate section 192 of the coupler body 176. The gasket openings 230, 232 can be the same, slightly smaller or slightly larger than the support opening 238. The fastener 182 can include an opening 234 and may further include optional inner threads complementary to the threads 210 of the intermediate section 192. A force can be applied by the fastener 182 to optional washer 210, and to the gaskets 178, and 180, to pre-compress them against the support surfaces and radial flange 196 of the coupler body. Where the fastener is a nut 182, or a nut with an integral washer, the nut can be engaged with and threaded onto the intermediate section 192 to compress the gaskets. The compressible and resilient gaskets 178, and 180 can provide a liquid seal between the support surfaces and coupler body once the gaskets are pre-compressed using the fastener 182.

The female coupler assembly 102 can be secured to a support with an opening. The support can be a wall, a flange, a handle, frame, or other interface that can act as a support for the female coupler assembly 102. For example, as illustrated in FIG. 1 and FIG. 3, the female coupler 102 can be configured to be secured to a wall 166 of a support which can be a portion of the wall of a container 104. In some embodiments the female coupler may be supported or attached to a lattice or frame of a growing tower. In some other embodiments the female coupler may be unsupported and can be mated with a supported male coupler 106 that utilizes compressible and resilient gaskets as disclosed herein. The support interface or wall 166 includes an opening 168 extending therethrough. The diameter of the opening 168 can be substantially equal to or slightly greater than the diameter of the intermediate section 128 of the coupler body 110. Although illustrated in FIG. 3 as being substantially adjacent to the outer surface of the intermediate section 128, it should be understood that the diameter of the opening 168 is dimensioned to accommodate pivoting of the intermediate section 128 within the opening 168. In embodiments of the disclosure where the support includes a container, the wall 166 includes an inner surface 170 facing the interior of the container 104 and towards coupler end 122, and an outer surface 172 facing away from the interior of the container 104 and towards coupler end 120.

The male coupler assembly 106 can be configured to be secured to a support with an opening. The support can be a wall, a flange, a handle, a frame, or other interface that can act as a support for the male coupler 106. For example, as illustrated in FIG. 1 and FIG. 5, the male coupler assembly 106 can be configured to be secured to a portion of a container wall 108 or more generally a support 236. In some embodiments the male coupler assembly 106 may be attached to a lattice or frame of a growing tower. In some other embodiments the male coupler may be unsupported and connected to a hose or conduit, the male coupler body 176 can be inserted into a supported female coupler 102 fixed to a support with an opening using gaskets as disclosed herein. The support interface or wall 236 includes an opening 238 extending therethrough. The diameter of the opening 238 can be substantially equal to or slightly greater than the diameter of the intermediate section 192 of the coupler. Although illustrated in FIG. 5 as being substantially adjacent to the outer surface of the intermediate section 192, it should be understood that the diameter of the opening 238 is dimensioned to accommodate pivoting of the intermediate section 192 within the opening 238. Where the support interface is part of a container, the wall 236 includes an inner surface 240 facing the interior of the container 104 and coupler end 188, and an outer container surface 242 facing away from the interior of the container 104 and towards the coupler end 190.

In some embodiments, the acts or steps of putting together components of the first coupler assembly or the female coupling assembly 102 illustrated in FIG. 3 can include the gasket 114 being positioned onto the intermediate section 128 and against the radial step 130 of the coupler body 110. The coupler body 110 can be inserted through the opening 168 of a support or a wall 166 such that the gasket 114 abuts the outer surface 172 of the support or wall 166. The gasket 112 can be positioned onto the intermediate section 128 and against the inner surface 170 of the support or wall 166. The gaskets 112, 114 are thereby positioned on opposing sides of and separated by the support or wall 166. Optionally, the washer 118 can be positioned onto the intermediate section 128 and against the gasket 112. A fastener 116 can be used to secure and compress the gaskets against the support surfaces. In some embodiments, the fastener 116 is a nut or a nut washer assembly that can be threaded onto the intermediate section 128 and positioned against the washer 118 (or the gasket 112 if a washer 118 is not used).

In some embodiments the fastener 116 can be selectively tightened against the gasket 112 to complete the assembly. As the fastener 116 is tightened against the gasket 112 to a threshold value or percent pre-loading or pre-compression of the gaskets, e.g., using a torque wrench, both gaskets 112, 114 are at least partially compressed and/or deformed to form a seal between the opening 168 in the support or wall 166 and the coupler body 110. In some embodiments, the compression or deformation of the gaskets 112, 114 seats the gaskets 112, 114 against the opening 168 in the support or wall 166 to form a fluid tight seal. In some embodiments, one or both gaskets 112, 114 are compressed partially into the opening 168 to form the fluid tight seal.

As illustrated in FIG. 3, the assembly of the female coupler 102 can have a central longitudinal axis 174. The front surface 172 of the support with opening 168 through the support can have an opening axis 177 that is substantially perpendicular to the front surface and a reference line 179 that lies in a plane of the front surface. The opening axis 177 can be the central longitudinal axis of the opening 168. Opening axis 177 can be parallel or co-linear with female coupler central longitudinal axis 174 when coupler body is in a non-pivoting position. Opening axis 177 can be co-linear with coupler central longitudinal axis 174 when coupler body is in a non-pivoting position and the coupler body 110 is centered within opening 168.

The compliant and resilient material and thickness of the gaskets 112, 114 allows the coupler body 110 to pivot, diverge, or deflect from an initial position in the opening where the opening axis 177 and female coupler central longitudinal axis 174 are substantially parallel or co-linear (zero degrees) to a second position where the female coupler central longitudinal axis 174 is non-parallel with the opening axis 177. The amount of pivoting or deflection of the coupler body 110 can be measured as the angle between the opening axis 177 and the female coupler central longitudinal axis 174. In some embodiments, such pivoting or deflection can be, e.g., between about 1° to about 10°, between about 1° to about 9°, between about 1° to about 8°, between about 1° to about 7°, between about 2° to about 6°, between about 3° to about 5°, between about 4° to about 5°, between about 3° to about 6°, between about 4° to about 6°, about 3°, about 4°, about 5°, about 6°, about 7°, or the like. In some embodiments, such deflection can equate to about ⅛ inches at the end 120 of the coupler body 110. In some embodiments, the deflection can equate to greater than or less than about ⅛ inches at the end 120 of the coupler body 110 depending on the thickness of the gaskets 112, 114. It should be understood that the pivoting or deflection of the coupler body 110 can occur in any radial direction relative to the wall 166, and the gaskets ensure reliable connection with the female coupler body 110. In some embodiments, the compliant and resilient material and thickness of the gaskets 112, 114 allows for the coupler body 110 to move, diverge or deflect from the opening axis 177 in any direction from an uncoupled state or position without sliding laterally within the opening to accommodate alignment and engagement with the male coupler 106, such deflection can be up to 7° (or up to) 10° from the uncoupled state or uncoupled position of the female coupler.

Figure 4:
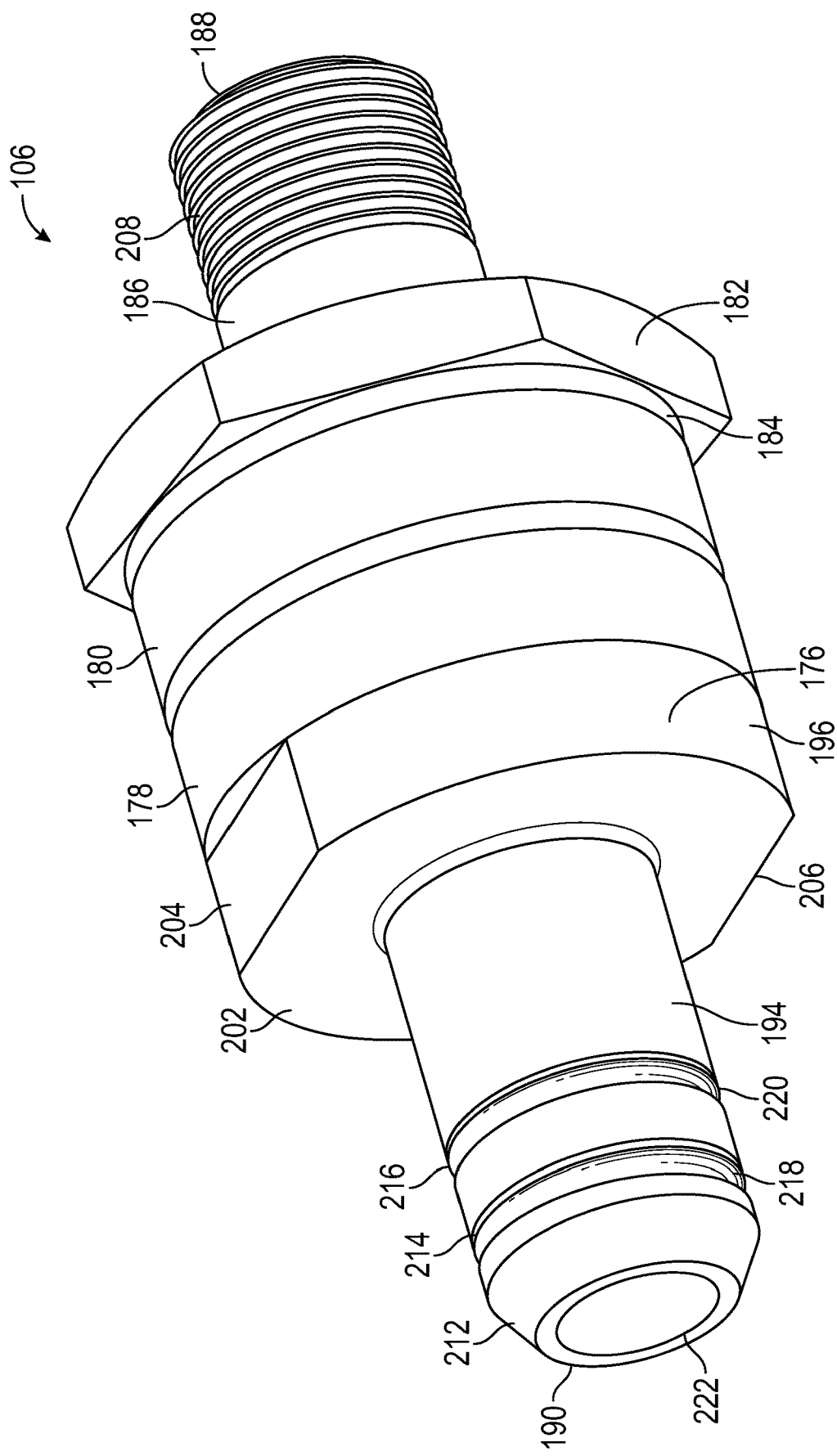
FIG. 4 is a perspective view of an embodiment of a second or male coupler assembly of the present disclosure.

FIGS. 4 and 5 show perspective and cross-sectional views of the male coupler 106 assembly. The assembly of the male coupler 106 includes a coupler body 176, two resilient gaskets 178, 180 (e.g., resilient gaskets can be substantially similar to gaskets 112, 114 of the female coupler assembly 102), and a fastener 182. In some embodiments, the male coupler assembly 106 can include a washer 184 positioned between the fastener 182 and one of the gaskets 180. In some embodiments the fastener 182 can be a nut or an integral nut washer. The coupler body 176 includes a first extension or section 186 at end 188 and extending towards end 190, an intermediate section 192 extending from the first section 186 towards end 190, a second extension or section 194 at end 190 and extending towards end 188, and a radial flange 196 disposed between the second section 194 and the intermediate section 192.

Each of the first section 186, the intermediate section 192, the second section 194 and the radial flange 196 can define a cylindrical or substantially cylindrical configuration. In some embodiments the first section 186 can define an outer diameter (e.g., about 1.05 inches) dimensioned less than an outer diameter of the intermediate section 192 (e.g., about 1.5 inches) and the radial flange 196. In some embodiments, the outer diameter of the first and second sections 186, 194 can be different. In some embodiments, the outer diameter of the first and second sections 186, 194 can be substantially equal (e.g., about 1.05 or 1.06 inches). The outer diameter of the second section 194 can be dimensioned slightly smaller than the inner diameter of the intermediate opening section 146 of the female coupler body 110 to allow for mating between the female coupler body 110 and male coupler body 102, 176.

The intermediate section 192 defines an outer diameter dimensioned greater than the outer diameters of the first and second sections 186, 194, and smaller than the outer diameter of the radial flange 196. The radial flange 196 defines an outer diameter dimensioned greater than the first section 186, the second section 194, and the intermediate section 192. The difference in diameters forms a radial step 198 between the first section 186 and the intermediate section 192, a radial step 200 between the intermediate section 192 and the radial flange 196, and a radial step 202 between the radial flange 196 and the second section 194. In some embodiments the diameter of the radial flange and the gasket 178 can be the same or substantially the same (excluding wrench flats 204 and 206 on the radial flange).

The outer surface of the radial flange 196 can include two flat opposing surfaces 204, 206 to facilitate gripping of the second coupler body 176 with a tool (e.g., wrench) during assembly. The outer surface of the first section 186 and the intermediate section 192 can include threads 208, 210 formed thereon. In some embodiments, the threads 208 of the first section 186 can be formed on only a portion of the outer surface of the first section 186 (e.g., threads 208 covering or formed in a portion of the outer surface from the end 188 towards the radial step 198). In some embodiments, the entire outer surface of the first section 186 can include threads 208. In some embodiments, the first section 186 of the coupler body 176 can include threads on the outer surface or other fitting at the end 188 to join the coupler body 176 with complementary to threads or fittings of an optional conduit or optional fluid distribution manifold. In some embodiments, the threads 210 of the intermediate section 192 can be formed on only a portion of the outer surface of the intermediate section 192 (e.g., threads 210 covering or formed in a portion of the outer surface from the radial step 198 towards the radial step 200). In some embodiments, the entire outer surface of the intermediate section 192 can include threads 210.

The outer surface of the radial flange 196 and the second section 194 can be free of threads. The second section 194 includes a beveled, tapered or chamfered radial surface 212 at the end 190. The chamfered radial surface 212 can define an angle of, e.g., between about 20° and about 40°, about 25° to about 35°, about 26° to about 34°, about 27° to about 33°, about 28° to about 32°, about 29° to about 31°, about 25°, about 26°, about 27°, about 28°, about 29°, about 30°, about 31°, about 32°, about 33°, about 34°, about 35°, or the like, as measured relative to a central longitudinal axis 244 of the coupler body 176. The chamfered radial surface 212 assists with insertion of the end 190 into the tapered opening section 144 of the opening 142 in the female coupler body 110.

In some embodiments, the angle of the chamfered radial surface 212 can be complementary to the angle of the tapered opening section 144 to assist with guiding the end 190 of the second section 194 into the intermediate opening section 146 of the female coupler body 110. In some embodiments, the angle of the chamfered radial surface 212 can be complementary to the angle of the tapered connection 152 between the intermediate opening section 146 and the opening section 148 of the female coupler 110. The second section 194 can include two radial grooves 214, 216 formed in a spaced manner near the chamfered radial surface 212. Each groove 214, 216 can be configured and dimensioned to receive therein a seal element 218, 220 (e.g., an O-ring) to create a fluid-tight seal between the second section 194 and the inner surface of the intermediate opening section 146 of the female coupler body 110.

The second coupler body or male coupler body 176 includes a passage or opening 222 extending therethrough from the first end 188 to the second end 190. The opening 222 includes a first opening section 224 extending through at least a portion of the first section 186 from the end 188 towards the end 190, and a second opening section 226 extending through the second section 194, the radial flange 196, the intermediate section 192, and partially through the first section 186. In some embodiments the first opening section 224 can have a diameter (e.g., about 0.74 inches) that is dimensioned greater than a diameter of the second opening section 226 (e.g., about 0.62 inches). The first opening section 224 can connect or transition to the second opening section 226 at a radial step 228.

The gaskets 178, 180 can be substantially similar to the gaskets 112, 114 of the female coupler assembly 102, and can include an opening 230, 232 extending through the gasket. In some embodiments, the radial cross section dimension of the gaskets 178, 180 ("R" in FIG. 5) of the gasket can be less than the axial cross section dimension ("A" in FIG. 5) of the gasket. The diameter of the openings 230, 232 can be dimensioned to accommodate the diameter of the intermediate section 192 of the coupler body 176 and form a fluid seal against the intermediate section. In some embodiments the diameter of the opening 230, 232 can be dimensioned substantially equal to or slightly greater than the diameter of the intermediate section 192 of the coupler body 176. The fastener, nut, or nut washer 182 can include an opening 234 with inner threads complementary to the threads 210 of the intermediate section 192 such that the fastener 182 can be engaged with and threaded onto the intermediate section 192.

The male coupler assembly 106 can be configured to be secured to a support, a flange, a handle, a frame assembly, or for example a wall 236 such as illustrated by container 108 in FIG. 1. In some embodiments, the wall 236 can be an opposing wall of a first container 108 with a secured male coupler assembly 106 positioned opposite to the wall 166 of a second container 104 with a secured female coupler assembly 102 as illustrated in FIG. 1 such that opposing sides of the container 108 and 104 can be substantially aligned and engaged with each other. The wall 236 can include an opening 238 extending therethrough. The diameter of the opening 238 can be substantially equal to or slightly greater than the diameter of the intermediate section 192. The wall 236 can includes an inner surface 240 facing the interior of the container 104, and an outer surface 242 facing away from the interior of the container 104.

In other embodiments of the disclosure, a male coupler assembly 106 and a mating female coupler assembly 102 can be secured to separate openings in the same container.

In some embodiments the male coupler body 176 and the female coupler body 110 can be configured on opposite container walls with the radial flange portions 196 and 124 of each coupler body positioned outside of the container. Configured in this way, containers can be coupled end to end.

During assembly of the male coupler assembly 106, the gasket 178 is positioned onto the intermediate section 192 and against the radial step 200. The coupler body 176 is inserted through the opening 238 of a support or the wall 236 such that the gasket 178 abuts the outer surface 242 of the support or wall 236. The gasket 180 is positioned onto the intermediate section 192 and against the inner surface 240 of the support or wall 236. The gaskets 178, 180 are thereby positioned on opposing sides of and separated by the support or wall 236. Optionally, the washer 184 can be positioned onto the intermediate section 192 and positioned against the gasket 180. A fastener 182 can be used to secure and compress the gaskets 178, 180 against the support surfaces. In some embodiments, the fastener 182 is a nut or a nut washer assembly that can be threaded onto the intermediate section 192 and positioned against the washer 184 (or the gasket 180 if a washer 184 is not used).

Similar to assembly of the female coupler assembly 102, the fastener 182 can be selectively tightened against the gasket 180 to complete the assembly. As the fastener 182 is tightened against the gasket 180 by a threshold value, both gaskets 178, 180 are at least partially compressed and/or deformed to form a seal between the opening 238 in the support or wall 236 and the coupler body 176. In some embodiments, the compression or deformation of the gaskets 178, 180 seats the gaskets 178, 180 against the opening 238 in the support or wall 236 to form a fluid tight seal. In some embodiments, the gaskets 178, 180 are compressed partially into the opening 238 to form the fluid tight seal.

As illustrated in FIG. 5 and FIGS. 7A-B, the male coupler body 176 can have a central longitudinal axis 244 that can extend the length of the male coupler body 176. The compliant and resilient material and thickness of the gaskets 178, 180 allows the coupler body 176 to pivot, diverge, or deflect from an initial position in the opening where an opening axis 277 and male coupler central longitudinal axis 244 are substantially parallel or co-linear (zero degrees) to a second position where the male coupler central longitudinal axis 244 is non-parallel with the opening axis 277. Such pivoting facilitates alignment and engagement with a female coupler body 110. In some embodiments, such deflection can be, e.g., between about 1° to about 10°, between about 1° to about 9°, between about 1° to about 8°, between about 1° to about 7°, between about 2° to about 6°, between about 3° to about 5°, between about 4° to about 5°, between about 3° to about 6°, between about 4° to about 6°, about 3°, about 4°, about 5°, about 6°, about 7°, or the like. In some embodiments, such deflection can equate to about ⅛ inches at the end 190 of the male coupler body 176. In some embodiments, such deflection can be greater than or less than about ⅛ inches, depending on the thickness of the gaskets. It should be understood that the pivoting or deflection of the male coupler body 176 can occur in any radial direction relative to the wall 236, and ensures reliable connection with the female coupler 102. The compliant and resilient material of the gaskets 178, 180 can allow for pivoting movement of the coupler body 176 about the opening 238.

FIG. 6 is a cross-sectional view of the coupling system 300, including a first coupler assembly or a female coupler assembly 102 engaged with a second coupler assembly or a male coupler assembly 106. Each support or wall 166, 236 has openings 168, 238 and respective outer surfaces 172, 242 in a facing relationship. In some embodiments the supports 166 and 236 can be walls of adjacent containers. In embodiments of the disclosure where the couplers are secured to container walls, during engagement of the coupler bodies 110, 176, the containers are substantially aligned relative to each other with the couplers 110, 176 in a facing relationship. As the containers are moved closer relative to each other, the second section 194 of the male coupler body 176 slides into the opening 142 (e.g. see FIG. 3) of the female coupler body 110 until the end 190 is positioned against or near the connection 152. In the fully coupled or assembled configuration of the system 300, the face or end 120 of the female coupler body 110 is positioned against the face defined by the radial step 202 of the male coupler body 176. The joined coupler bodies 110 and 176 can share a common axis 246.

Misalignment between the coupler bodies 110, 176 secured to supports utilizing the resilient gasket can be overcome based on the permitted pivoting or deflection of the intermediate section 128 of the female coupler body 110 in the assembly 102 relative to the wall 166 and/or pivoting or deflection of the second section 194 of the male coupler body 176 in the assembly 106 relative to the wall 236. For example, each of the coupler assemblies 102, 106 can allow for pivoting or deflection of about ⅛ inches (or more or less than about ⅛ inches) at the respective ends 120, 190 based on the axial and/or radial dimensions (e.g. A and R) and/or flexibility of the gaskets 112, 114 178, 180, with a total potential pivoting or deflection of about ¼ inches (or more or less than about ¼ inches). Such pivoting or deflection ensures that the coupler bodies 110, 176 engage and couple in a fluid tight manner, while maintaining the fluid tight seal between the coupler body 110, 176 and the respective walls 166, 236. As such, even if the couplers 110, 176 are initially misaligned relative to each other, the permitted deflection of the coupler assemblies 102, 106 allows for the male coupler body 176 to properly seat within the female coupler body 110 such that both coupler bodies 110, 176 are substantially aligned along a common central longitudinal axis 246.

The following clauses define particular aspects and embodiments of the disclosure.

Clause 1. A female fluid coupler assembly 102 for a support with an opening and comprising:
- a female coupler body 110 having a first end 120 with a tapered inlet 144 and a second end 122, a passage or opening 142 extending from the first end 120 to the second end 122, the first end 120 in fluid communication with the second end 122 of the female coupler body 110, the first end 120 adapted to receive a male fluid coupler, the second end 122 adapted for connection to a fluid conduit;
- an outer surface of the female coupler body 110 further comprises a radial flange 124 extending from the first end 120 toward the second end 122, the radial flange has a radial step 130 to an intermediate section 128, a second section 126 extending from the second end 122 of the coupler body towards the first end 120 of the first coupler body, the intermediate section 128 disposed between the first section 124 and the second section 126, a fastener 116, and a first compressible and resilient gasket 112 and a second compressible and resilient gasket 114; the radial flange 124 positioned at the first end 120 of the female coupler body 110 has an outside diameter larger than the intermediate section 128 of the female coupler body, the intermediate section 128 disposed between the radial flange 124 and the second end 122 of the female coupler body 110 adapted to pass through openings in the first and second gaskets and through the opening in the support; the fastener 116 adapted to form a pivoting fluid seal by pre-compressing the first gasket 112 on a first side of the support opening against the support and further compress the second gasket 114 between a second side of the support and the radial step surface 130 of the radial flange portion 124;
- the first compressible and resilient gasket and the second compressible and resilient gasket composed of compressible and resilient materials and have dimensions that enable the coupler body 110 to reversibly pivot from an initial position with respect to an opening axis of the support surface to accommodate alignment and engagement with the male coupler 106.

Clause 2. The female fluid coupler assembly 102 for a support of clause 1 wherein an axial dimension of a cross section of the first gasket, the second gasket, or both is larger than a radial dimension of a cross section of the gaskets.

Clause 3, The female coupler assembly for a support as in any one of clauses 1-2, further comprising a support and an opening, and first and second compressible and resilient gaskets on opposite sides of the support pre-compressed and sealed against the support wall, the pivoting fluid seal is maintained when the coupler body reversibly pivots about the opening between about 1 degree to about 7 degrees, inclusive.

Clause 4. The female coupler assembly for a support as in any one of clauses 1-3, in which the gasket is comprised of an elastomer with a Shore A hardness of between 30 and 50.

Clause 5. The female coupler assembly for a support as in any one of clauses 1-4, wherein the compressible and resilient gaskets are pre-compressed by less than 40 percent of the thickness of the un-compressed gasket.

Clause 6. A male fluid coupler assembly 106 for a support with an opening and comprising: a male coupler body 176 having a first end 188, a second end 190 with a tapered beveled inlet 212, a passage 222 from first end 180 to the second end 190, the first end 188 is in fluid communication with the second end 190 through the passage 222, the second end 190 adapted to engage with a female fluid coupler, the first end 188 adapted for connection to a fluid conduit;
- an outer surface of the coupler body 176 comprises a first section 186 extending from a first end 188 towards a second end 190, a second section 194 extending from the second end 190 towards the first end 188, an intermediate section 192 disposed adjacent to the first section 186, and a radial flange section 196 disposed between the second section 194 and the intermediate section 192; the diameter of the radial flange 196 dimensioned greater than a diameter of the intermediate section 192, the first section 186, and the second section 194;
- the intermediate section 192 is adapted to pass through center opening 232 of a first compressible and resilient gasket 180, pass through a center opening 230 of a second compressible and resilient gasket 178, and pass through the opening in the support; a fastener 182 is adapted to form a pivoting fluid seal by pre-compressing the first gasket 180 on a first side of the support 236 against the support and the fastener 182 further compresses the second gasket 178 between a second side of the support 236 and the radial step surface 200 of the radial flange portion 196;

the first compressible and resilient gasket 180 and the second compressible resilient gasket 178 composed of compressible and resilient materials and have dimensions that enable the coupler body 176 to reversibly pivot between about 1 degree to about 7 degrees, inclusive from an initial position with respect to an opening axis of the support surface to accommodate alignment and engagement with the female coupler 106.

Clause 7. The male fluid coupler assembly for a support of clause 6 wherein an axial dimension of a cross section of the first gasket, the second gasket, or both, is larger than a radial dimension of a cross section of the gasket.

Clause 8. The male coupler assembly as in any one of clauses 6-7 further comprising a support and an opening, and the first and second compressible resilient gaskets on opposite sides of the support pre-compressed and sealed against the support wall to form a pivoting fluid seal with the support that is maintained when the coupler body reversibly pivots about the opening between about 1 degree to about 7 degrees, inclusive.

Clause 9. The male coupler assembly for a support as in any one of clauses 6-8, in which the gasket is comprised of an elastomer with a Shore A hardness of between 35 and 50.

Clause 10. The male coupler assembly for a support as in any one of clauses 6-9, wherein the compressible and resilient gaskets are pre-compressed by less than 40 percent of the thickness of the un-compressed gasket.

Clause 11. A kit comprising a female coupler assembly as in any one of clauses 1-5.

Clause 12. A kit comprising a male coupler assembly as in any one of clauses 6-10.

Clause 13. A container comprising the female coupler assembly as in any one of clauses 1-5 and the male coupler assembly as in any one of clauses 6-10, the container comprising:
- a first wall, a second wall opposite the first wall, a third wall joining the first wall and the second wall, a fourth wall that joins the first wall and the second wall and that is opposite the third wall, a bottom surface joined to the bottom of the first wall, the second wall, the third wall and the fourth wall, the top of the first wall, the second wall, the third wall and the fourth wall form an opening of the container; the first wall defining an inner surface and an outer surface, and a first opening formed in the first wall; the second wall defining an inner surface and an outer surface, and a second opening formed in the second wall.
- the female coupler body of the female coupler assembly extending through the first opening of the first container wall, a first resilient gasket positioned over the first coupler body and against the inner surface of the first wall, and a second resilient gasket positioned over the first coupler body and against the outer surface of the first wall, the tapered inlet of the female coupler body extends outwardly from the outer surface of the first wall, the first and second resilient gaskets form a pivoting fluid seal of the female coupler body with the first wall;
- the male coupler body of the male coupler assembly extending through a first opening of the second container wall opposite the first container wall, a third resilient gasket positioned over the second coupler body and against the inner surface of the second wall, and a fourth resilient gasket positioned over the second coupler body and against the outer surface of the second wall, the second end 190 with the tapered beveled inlet 212 of the male coupler body extends outwardly from the outer surface of the second wall, the third and fourth resilient gaskets form a pivoting fluid seal the male coupler body with the second wall.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A container coupling system, comprising:
   - a first container including a first wall defining an inner surface and an outer surface, and a first opening formed in the first wall;
   - a second container including a second wall defining an inner surface and an outer surface, and a second opening formed in the second wall;
   - a first coupler body extending through the first opening of the first container, a first gasket positioned over the first coupler body and against the inner surface of the first wall, and a second gasket positioned over the first coupler body and against the outer surface of the first wall, the first and second gaskets form a fluid tight seal between the first coupler body and the first wall while permitting pivoting of the first coupler body relative to the first wall; and
   - a second coupler body extending through the second opening of the second container, a third gasket positioned over the second coupler body and against the inner surface of the second wall, and a fourth gasket positioned over the second coupler body and against the outer surface of the second wall, the third and fourth gaskets form a fluid tight seal between the second coupler body and the second wall while permitting pivoting of the second coupler body relative to the second wall;
   - wherein at least one of (i) the first coupler is configured to be pivoted relative to the first wall or (ii) the second coupler is configured to be pivoted relative to the second wall during engagement between the first coupler and the second coupler to overcome misalignment between the first coupler and the second coupler.

2. The container coupling system of claim 1, wherein the first coupler includes a first nut in threaded engagement with the first coupler body, and the second coupler includes a second nut in threaded engagement with the second coupler body.

3. The container coupling system of claim 2, wherein the first nut compresses the first and second gaskets against the first coupler body and the first wall, and the second nut compresses the third and fourth gaskets against the second coupler body and the second wall.

4. The container coupling system of claim 2, wherein the first nut partially compresses the first and second gaskets into the first opening of the first wall, and the second nut partially compresses the third and fourth gaskets into the second opening of the second wall.

5. The container coupling system of claim 2, wherein the first coupler includes a first washer disposed between the first nut and the first gasket, and the second coupler includes a second washer disposed between the second nut and the third gasket.

6. The container coupling system of claim 1, wherein the first coupler body includes an opening extending therethrough, the opening including a tapered section at a first end of the first coupler body.

7. The container coupling system of claim 1, wherein the first coupler body includes a first section extending from a first end towards a second end of the first coupler body, a second section extending from the second end towards the first end of the first coupler body, and an intermediate section disposed between the first and second sections.

8. The container coupling system of claim 7, wherein a diameter of the first section is dimensioned greater than a diameter of the second and intermediate sections, and the diameter of the intermediate section is dimensioned greater than the diameter of the second section.

9. The container coupling system of claim 7, wherein the second section includes threads on an outer surface complementary to threads of a nutrient solution distribution manifold.

10. The container coupling system of claim 1, wherein the second coupler body includes an opening extending therethrough.

11. The container coupling system of claim 1, wherein the second coupler body includes a first section extending from a first end towards a second end, a second section extending from the second end towards the first end, an intermediate section disposed adjacent to the first section, and a radial flange disposed between the second section and the intermediate section.

12. The container coupling system of claim 11, wherein a diameter of the radial flange is dimensioned greater than a diameter of the intermediate section, the first section, and the second section, and the diameter of the intermediate section is dimensioned greater than the diameter of the first and second sections.

13. The container coupling system of claim 11, wherein the second section of the second coupler body includes at least one radial groove and at least one sealing element disposed within the at least one radial groove.

14. The container coupling system of claim 13, wherein the at least one sealing element creates a fluid tight seal between the first coupler body and the second coupler body.

15. The container coupling system of claim 11, wherein the second section of the second coupler body includes a tapered edge at the second end.

16. A method of coupling containers, comprising:
providing a first container including a first wall defining an inner surface and an outer surface, and a first opening formed in the first wall;
providing a second container including a second wall defining an inner surface and an outer surface, and a second opening formed in the second wall;
mounting a first coupler relative to the first container, the first coupler including a first coupler body extending through the first opening of the first container, a first gasket positioned over the first coupler body and against the inner surface of the first wall, and a second gasket positioned over the first coupler body and against the outer surface of the first wall, the first and second gaskets form a fluid tight seal between the first coupler body and the first wall while permitting pivoting of the first coupler relative to the first wall;
mounting a second coupler relative to the second container, the second coupler including a second coupler body extending through the second opening of the second container, a third gasket positioned over the second coupler body and against the inner surface of the second wall, and a fourth gasket positioned over the second coupler body and against the outer surface of the second wall, the third and fourth gaskets form a fluid tight seal between the second coupler body and the second wall while permitting pivoting of the second coupler relative to the second wall;
positioning the first container adjacent to the second container with the first and second couplers in a facing relationship; and
pivoting at least one of the first coupler relative to the first wall or the second coupler relative to the second wall during engagement between the first coupler and the second coupler to overcome misalignment between the first coupler and the second coupler.

17. The method of claim 16, comprising tightening a first nut against the first gasket and tightening a second nut against the third gasket.

18. The method of claim 16, wherein tightening the first nut against the first gasket compresses the first and second gaskets against the first coupler body and the first wall, and tightening the second nut against the third gasket compresses the third and fourth gaskets against the second coupler body and the second wall.

19. The method of claim 16, wherein tightening the first nut against the first gasket partially compresses the first and second gaskets into the first opening of the first wall, and tightening the second nut against the third gasket partially compresses the third and fourth gaskets into the second opening of the second wall.

20. A female fluid coupler assembly for a support with an opening, the female fluid coupler assembly comprising:
a female coupler body having a first end with a tapered inlet and a second end, a passage or opening extending from the first end to the second end, the first end in fluid communication with the second end of the female coupler body, and the first end adapted to receive a male fluid coupler, the second end adapted for connection to a fluid conduit;
an outer surface of the female coupler body further comprises a radial flange extending from the first end toward the second end, the radial flange has a radial step to an intermediate section, a second section extending from the second end of the female coupler body towards the first end of the first coupler body, the intermediate section disposed between the radial flange and the second section, a fastener, and a first compressible and resilient gasket and a second compressible and resilient gasket;
the radial flange positioned at the first end of the female coupler body has an outside diameter larger than the intermediate section of the female coupler body, the intermediate section disposed between the radial flange and the second end of the female coupler body adapted to pass through openings in the first and second gaskets and through the opening in the support;
the fastener adapted to form a pivoting fluid seal by pre-compressing the first gasket on a first side of the support opening against the support and further compress the second gasket between a second side of the support and the radial step of the radial flange; and
the first compressible and resilient gasket and the second compressible and resilient gasket are composed of compressible and resilient materials and have dimensions that enable the coupler body to reversibly pivot from an initial position with respect to an opening axis of the support to accommodate alignment and engagement with the male coupler;

wherein after pre-compression of the first gasket and compression of the second gasket, the female coupler body is configured to be pivoted relative to the support during engagement between the first end of the female coupler body and the male fluid coupler to overcome misalignment between the first end of the female coupler body and the male fluid coupler.

21. The female fluid coupler assembly of claim 20, wherein an axial dimension of a cross section of the first gasket, the second gasket, or both, is larger than a radial dimension of a cross section of the gaskets.

22. The female coupler assembly of claim 21, further comprising the support and the opening, and the first and second compressible and resilient gaskets on opposite sides of the support pre-compressed and sealed against a support wall, and the pivoting fluid seal is maintained when the coupler body reversibly pivots about the support opening between about 1 degree to about 7 degrees, inclusive.

23. The female coupler assembly of claim 20, wherein the first and second gaskets are comprised of an elastomer with a Shore A hardness of between 30 and 50, inclusive.

24. The female coupler assembly of claim 20, wherein the compressible and resilient gaskets are pre-compressed by less than 40 percent of a thickness of the un-compressed gasket.

25. A male fluid coupler assembly for a support with an opening, the male fluid coupler assembly comprising:
   a male coupler body having a first end, a second end with a tapered beveled inlet, a passage from the first end to the second end, the first end is in fluid communication with the second end through the passage, the second end adapted to engage with a female fluid coupler, the first end adapted for connection to a fluid conduit;
   an outer surface of the coupler body comprises a first section extending from a first end towards a second end, a second section extending from the second end towards the first end, an intermediate section disposed adjacent to the first section, and a radial flange section disposed between the second section and the intermediate section, wherein a diameter of the radial flange is dimensioned greater than a diameter of the intermediate section, the first section, and the second section;
   the intermediate section is adapted to pass through center opening of a first compressible and resilient gasket, pass through a center opening of a second compressible and resilient gasket, and pass through the opening in the support;
   a fastener is adapted to form a pivoting fluid seal by pre-compressing the first gasket on a first side of the support against the support and the fastener further compresses the second gasket between a second side of the support and a radial step surface of the radial flange portion; and
   the first compressible and resilient gasket and the second compressible resilient gasket are composed of compressible and resilient materials and have dimensions that enable the coupler body to reversibly pivot between about 1 degree to about 7 degrees, inclusive, from an initial position with respect to an opening axis of the support to accommodate alignment and engagement with the female coupler;
   wherein after pre-compression of the first gasket and compression of the second gasket, the male coupler body is configured to be pivoted relative to the support during engagement between the second end of the male coupler body and the female fluid coupler to overcome misalignment between the second end of the male coupler body and the female fluid coupler.

26. The male fluid coupler assembly of claim 25, wherein an axial dimension of a cross section of the first gasket, the second gasket, or both, is larger than a radial dimension of a cross section of the gaskets.

27. The male coupler assembly of claim 26, further comprising the support and the opening, and the first and second compressible resilient gaskets on opposite sides of the support pre-compressed and sealed against a support wall to form the pivoting fluid seal with the support that is maintained when the coupler body reversibly pivots about the support opening between about 1 degree to about 7 degrees, inclusive.

28. The male coupler assembly of claim 25, wherein the first and second gaskets are comprised of an elastomer with a Shore A hardness of between 35 and 50, inclusive.

29. The male coupler assembly of claim 25, wherein the compressible and resilient gaskets are pre-compressed by less than 40 percent of a thickness of the un-compressed gasket.

30. A kit comprising the female coupler assembly of claim 20.

31. A kit comprising the male coupler assembly of claim 25.

32. A container comprising the female coupler assembly of claim 20 and the male coupler assembly of claim 25, the container comprising:
   a first wall, a second wall opposite the first wall, a third wall joining the first wall and the second wall, a fourth wall that joins the first wall and the second wall and that is opposite the third wall, a bottom surface joined to the bottom of the first wall, the second wall, the third wall and the fourth wall, the top of the first wall, the second wall, the third wall and the fourth wall form an opening of the container; the first wall defining an inner surface and an outer surface, and a first opening formed in the first wall; the second wall defining an inner surface and an outer surface, and a second opening formed in the second wall;
   the female coupler body of the female coupler assembly extending through the first opening of the first container wall, a first resilient gasket positioned over the first coupler body and against the inner surface of the first wall, and a second resilient gasket positioned over the first coupler body and against the outer surface of the first wall, the tapered inlet of the female coupler body extends outwardly from the outer surface of the first wall, and the first and second resilient gaskets form a pivoting fluid seal of the female coupler body with the first wall; and
   the male coupler body of the male coupler assembly extending through the second opening of the second container wall opposite the first container wall, a third resilient gasket positioned over the second coupler body and against the inner surface of the second wall, and a fourth resilient gasket positioned over the second coupler body and against the outer surface of the second wall, the second end with the tapered beveled inlet of the male coupler body extends outwardly from the outer surface of the second wall, and the third and fourth resilient gaskets form a pivoting fluid seal of the male coupler body with the second wall.

* * * * *